(12) United States Patent
Nayar et al.

(10) Patent No.: US 11,461,924 B1
(45) Date of Patent: Oct. 4, 2022

(54) LONG DISTANCE QR CODE DECODING

(71) Applicant: Snap Inc., Santa Monica, CA (US)

(72) Inventors: Shree K. Nayar, New York, NY (US);
Jian Wang, Long Island City, NY (US);
Wenzheng Chen, New York, NY (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/948,585

(22) Filed: Sep. 24, 2020

Related U.S. Application Data

(60) Provisional application No. 62/907,358, filed on Sep. 27, 2019.

(51) Int. Cl.
| | |
|---|---|
| *G06T 7/73* | (2017.01) |
| *G06T 7/11* | (2017.01) |
| *G06K 7/14* | (2006.01) |
| *G06K 7/10* | (2006.01) |
| *G06N 20/00* | (2019.01) |
| *G06K 9/62* | (2022.01) |
| *G06T 11/20* | (2006.01) |
| *G06V 10/40* | (2022.01) |

(52) U.S. Cl.
CPC ............ *G06T 7/73* (2017.01); *G06K 7/10722* (2013.01); *G06K 7/1417* (2013.01); *G06K 9/6256* (2013.01); *G06K 9/6267* (2013.01); *G06N 20/00* (2019.01); *G06T 7/11* (2017.01); *G06T 11/20* (2013.01); *G06V 10/40* (2022.01); *G06T 2207/20081* (2013.01); *G06T 2207/20084* (2013.01); *G06T 2207/20132* (2013.01); *G06T 2210/12* (2013.01)

(58) Field of Classification Search
CPC ........... G06T 7/73; G06T 11/20; G06N 20/00; G06K 7/10722; G06K 9/46; G06K 19/06103; H04L 63/0861
See application file for complete search history.

(56) References Cited

U.S. PATENT DOCUMENTS

| | | | |
|---|---|---|---|
| 10,146,971 B1* | 12/2018 | Cansizoglu | .......... G06K 7/1417 |
| 10,164,975 B1* | 12/2018 | Son | ........................ H04W 12/77 |
| 2018/0239144 A1* | 8/2018 | Woods | .................. A63F 13/212 |

OTHER PUBLICATIONS

"QR code recognition based on image processing." international conference on information science and technology. IEEE) (Year: 2011).*

(Continued)

*Primary Examiner* — Nancy Bitar
(74) *Attorney, Agent, or Firm* — Schwegman Lundberg & Woessner, P.A.

(57) ABSTRACT

Systems and methods are provided for: receiving an image containing a code that has one or more visual qualities that fail to satisfy respective thresholds; applying a trained machine learning model to find a rough location of the code by generating a bounding box and cropping out the portion of the image; applying another trained machine learning model to the portion of the image to estimate key point locations of the code depicted in the portion of the image, aligning the portion of the image that depicts the code based on the estimated key point locations; and decoding, by the other trained machine learning model, the aligned portion of the image that depicts the code.

19 Claims, 18 Drawing Sheets
(7 of 18 Drawing Sheet(s) Filed in Color)

(56) References Cited

OTHER PUBLICATIONS

"Barcode detection and decoding method based on deep learning," 2019 2nd International Conference on Information Systems and Computer Aided Education (ICISCAE), 2019, pp. 393-396) (Year: 2019).*

* cited by examiner

LONG DISTANCE QR CODE DECODING

CROSS-REFERENCE TO RELATED APPLICATIONS

The present disclosure claims the benefit of priority to U.S. Provisional Application No. 62/907,358, filed Sep. 27, 2019, which is hereby incorporated by reference in its entirety.

TECHNICAL FIELD

The present disclosure relates generally to capturing content code images with a camera to access content or enable features.

BACKGROUND

Barcodes of various dimensions (1 dimensional or 2 dimensional barcodes), such as quick response (QR) codes, have become commonplace in various environments. For example, the barcodes can be included in various advertisements (images of advertisements) shown on websites and physical real-world billboards. A QR code may encode a server URL (Uniform Resource Locator) for a website and other information. The user scans the QR code with the mobile device. The mobile device decodes the QR code to obtain the server URL and other information encoded in the QR code. The mobile device can then access the website via the URL to download various content associated with the QR code.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
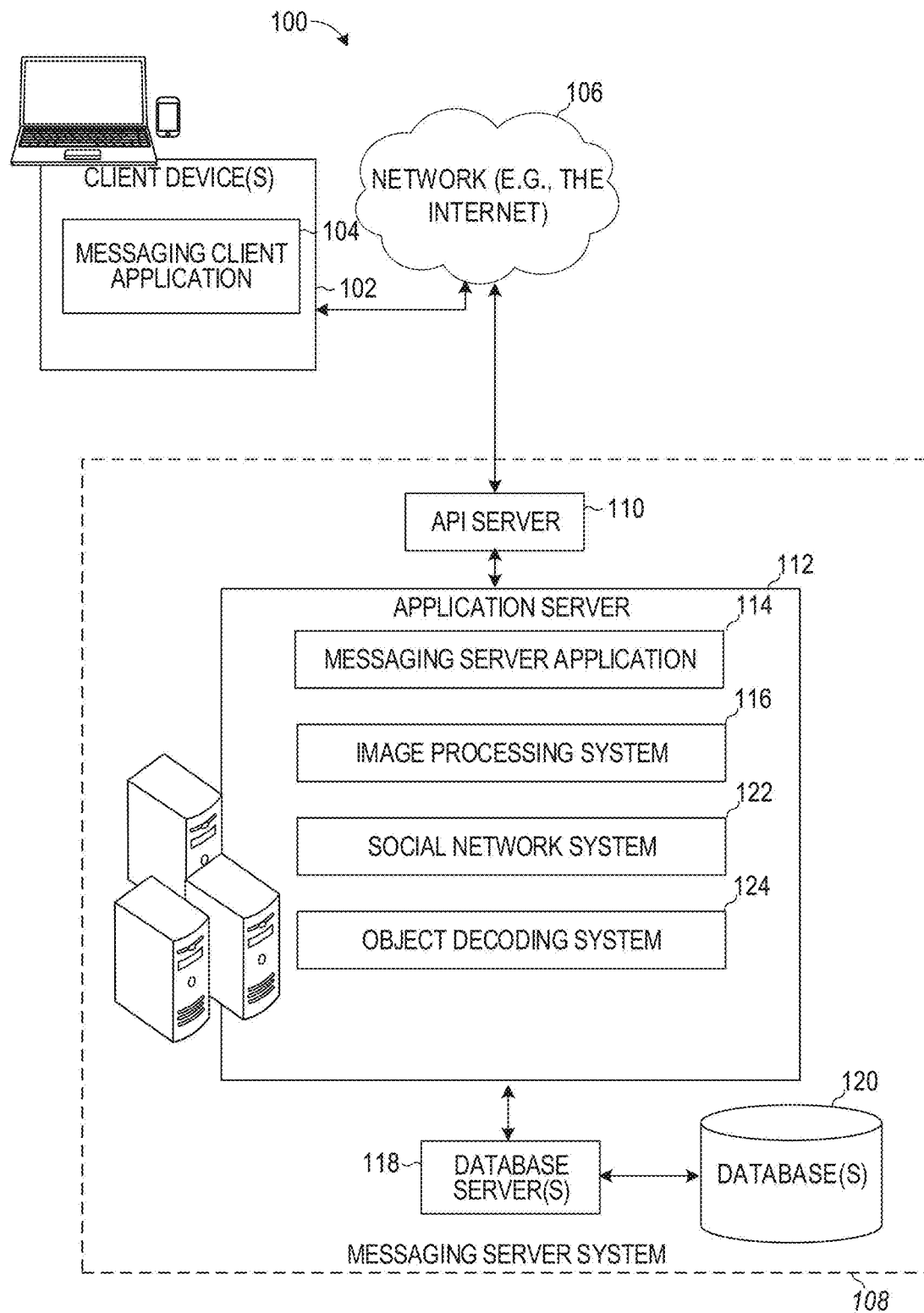
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Typically, advertising systems place QR codes in various environments on target items, such as in posters, websites and billboards. To successfully scan such QR codes in typical systems, users have to properly position their mobile device cameras relative to the target item that includes the QR code to ensure the image of the QR code that is captured and decoded satisfies certain image quality metrics. For example, the image resolution of the QR code image has to be high enough by capturing the image in close proximity to the target item, such as less than ten times of code size; the QR code in the image needs to be properly aligned relative to the camera so that the QR code is tilted less than 45 degrees; and the image containing the QR codes cannot have out-of-focus blur with kernel size larger than ⅕ of one bit size. As users attempt to capture the images of the QR codes from further distances and with some misalignment or blur, decoding the QR codes from the images require further processing resources and time. In many cases, the decoding of the QR codes even with such further processing resources and time end up failing. This places a burden on the users, wastes the users' time and ends up diminishing the overall experience of the users. As a result, resources advertisers place in adding the QR codes to the target items end up going to waste as users lose interest in scanning or paying attention to the QR codes.

The disclosed embodiments improve the efficiency of using the electronic device by applying machine learning technique (model) to a portion of an image that includes a content item code, that fails to satisfy one or more image quality metrics, to improve the ability to decode such a content item code. Specifically, the disclosed embodiments receive a portion of an image that depicts a content item code that has one or more visual qualities that fail to satisfy one or more respective thresholds. The disclosed embodiments apply a trained machine learning model to the portion of the image to generate a key point heatmap that identifies key point locations of the content item code depicted in the portion of the image, the trained machine learning model being trained to establish a relationship between image portions that depict content item codes with the one or more visual qualities that fail to satisfy the one or more respective thresholds and key point locations of the content item codes depicted in the image portions. In some cases, the machine learning technique is trained using a geometric constraint in which the detected four corner points of content item code must be perspective projection of a square in space. The disclosed embodiments align the portion of the image that depicts the content item code based on the key point heatmap and then decode the aligned portion of the image.

In this way, the disclosed embodiments allow a user to capture and decode an image of a content item code from far greater distances, with far larger tilts and with far more out-of-focus blur than typical systems. This increases the overall efficiency and reduces processing requirements for decoding content item codes from further distances and with some misalignment or blur. In some cases, an image that includes a content item code that has an image resolution greater than 1.5 times of the number of code bits, in which the content item code is tilted by more than 45 degrees, and has blur of blur kernel size within range of ⅕ and 2 of one bit size, can successfully be decoded after applying the disclosed machine learning technique.

FIG. 1 is a block diagram showing an example messaging system 100 for exchanging data (e.g., messages and associated content) over a network 106. The messaging system 100 includes multiple client devices 102, each of which hosts a number of applications, including a messaging client application 104. Each messaging client application 104 is communicatively coupled to other instances of the messaging client application 104, and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108 includes functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the messaging server application 114, and for possible access by another messaging client application 104; the setting of a collection of media data (e.g., story); the retrieval of such collections; the retrieval of a list of friends of a user of a client device 102; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114, an image processing system 116, a social network system 122, and the object decoding system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends.

The application server 112 is communicatively coupled to a database server 118, which facilitates access to a database 120 in which is stored data associated with messages processed by the messaging server application 114.

The object decoding system 124 receives an image captured by a client device 102 that contains a content item code. The content item code may be a 1-dimensional barcode, a 2-dimensional barcode, a 3-dimensional barcode, and/or a graphic barcode in which a central image is surrounded by a code pattern. For example, the graphic barcode may be a rectangular or square graphic that includes a central image and a code region between a border of the central image and a border of the rectangular or square graphic. In some embodiments, the content item code depicted in the image may have poor image quality. For example, the content item code may have been captured from far away, very quickly, and/or with an unstable poor quality camera. As a result, the content item code depicted in the image may have one or more visual qualities that fail to satisfy one or more respective thresholds.

The one or more visual qualities that fail to satisfy the thresholds may include any combination of an image resolution that is outside an image resolution threshold range, a tilt that is greater than a number of degrees threshold, a brightness that is outside a brightness threshold range, noise that exceeds a noise threshold, or an amount of image blur that is greater than a blur threshold range. In some implementations, the image resolution threshold range is between 1.5N×1.5N and above for a given content item code that comprises N×N bits; the number of degrees threshold is 45 degrees; and the blur kernel size threshold range is between 0.2 and 2 of bit size, for example, 1 and 10 pixels for a given image that is 128×128 in which a given content item code that comprises 18×18 bits occupies at least 70% of the area.

The object decoding system 124 processes the image to find a portion of the image that contains the content item code. The object decoding system 124 crops out a square region (or other suitable shape) that encloses the portion of the image that contains the content item code. In some embodiments, the object decoding system 124 detects a plurality of equal or non-equal sized portions of the image which contain the content item code using a trained machine learning model. In some cases, the captured images are processed by convolving with one or more feature extraction filters, such as Haar filters.

The trained machine learning model associates each of the plurality of portions with a classification that indicates whether a given one of the plurality of portions includes the content item code or whether the given one of the portions does not include the content item code. The object decoding system 124 generates a bounding box (circle or other suitable shape) around the portion of the plurality of portions of the image that is associated with the classification that indicates that the portion includes the content item code. In some cases, the bounding box is generated by applying non-maximum suppression to the portion that is associated with the classification that indicates the portion includes the content item code. In some implementations, the trained machine learning model that classifies whether a content item code is detected includes at least one of a nearest neighbor technique, a support vector machine learning technique, or a neural network.

The object decoding system 124 applies another trained machine learning model to the cropped portion of the image that contains the content item code to estimate key point locations of the content item code depicted in the portion of the image. Specifically, the object decoding system 124 trains a machine learning technique (model or algorithm) to establish a relationship between image portions that depict content item codes with the one or more visual qualities that fail to satisfy the one or more respective thresholds and key point locations of the content item codes depicted in the image portions. In this way, the machine learning technique can predict or estimate the four corners or other points that surround the content item code.

In some cases, to train the machine learning technique to identify the key points of content item codes, the object decoding system 124 obtains a set of training data that includes a plurality of images of one or more training content item codes, each image representing a different distance, different brightness, a different noise level, degree of tilt, and amount of blur of the respective one or more training content item codes. The object decoding system 124 obtains a first training data pair that includes a training image portion that depicts a training content item code with the one or more visual qualities that fail to satisfy the one or more respective thresholds and a training ground truth content item code. Then, the object decoding system 124 processes the training image portion with the machine learning model to estimate key point locations of the training content item code depicted in the training image portion and computes a deviation between the estimated key point locations and key point locations of the training ground truth content item code. The object decoding system 124 updates parameters of the machine learning technique based on the computed deviation. In some embodiments, the machine learning model includes a neural network and the object decoding system 124 applies a loss function to the machine learning model that includes a geometric constraint in which four detected corner points must be perspective projection of a real square in 3D space according to the intuition that given three known corners of projection of a square, a fourth corner is constrained to lie in at most four possible locations.

The object decoding system 124 retrieves another pair of training data and repeats the process of estimating key point locations of the training content item code and computing a deviation to update parameters of the machine learning technique again. This process is repeated until all of the training data has been processed.

In some embodiments, after the content item code key points are identified, the object decoding system 124 aligns the portion of the image that depicts the content item code based on the estimated key point locations and decodes the aligned portion of the image that depicts the content item code. In some cases, the object decoding system 124, after aligning the portion of the image that depicts the content item code and before decoding the content item code, applies a code-region mask, where code region is 1 and other regions are 0, to the aligned portion of the image that depicts the content item code; normalizes the aligned portion of the image that depicts the content item code to which the code-region mask was applied to output a normalized image; and then applies a decoding process to normalized image generate a bitstream comprising instructions for a messaging client application.

In some embodiments, when the object decoding system 124 decodes the content item code, the object decoding system 124 decodes the instructions for the messaging client application 104 that are encoded in the content item code. The object decoding system 124 causes the messaging client application 104 to perform a function based on the decoded instructions. For example, as a result of capturing an image of the content item code and decoding the content item code, the messaging client application 104 may add one or more new friends to an account of a user with the messaging client application 104, activate one or more image modification functions of the messaging client application 104 (e.g., filters, graphical elements, text, universal resource locators, and so forth), or retrieve one or more content items stored at a remote location referenced by the decoded instructions.

Figure 2:
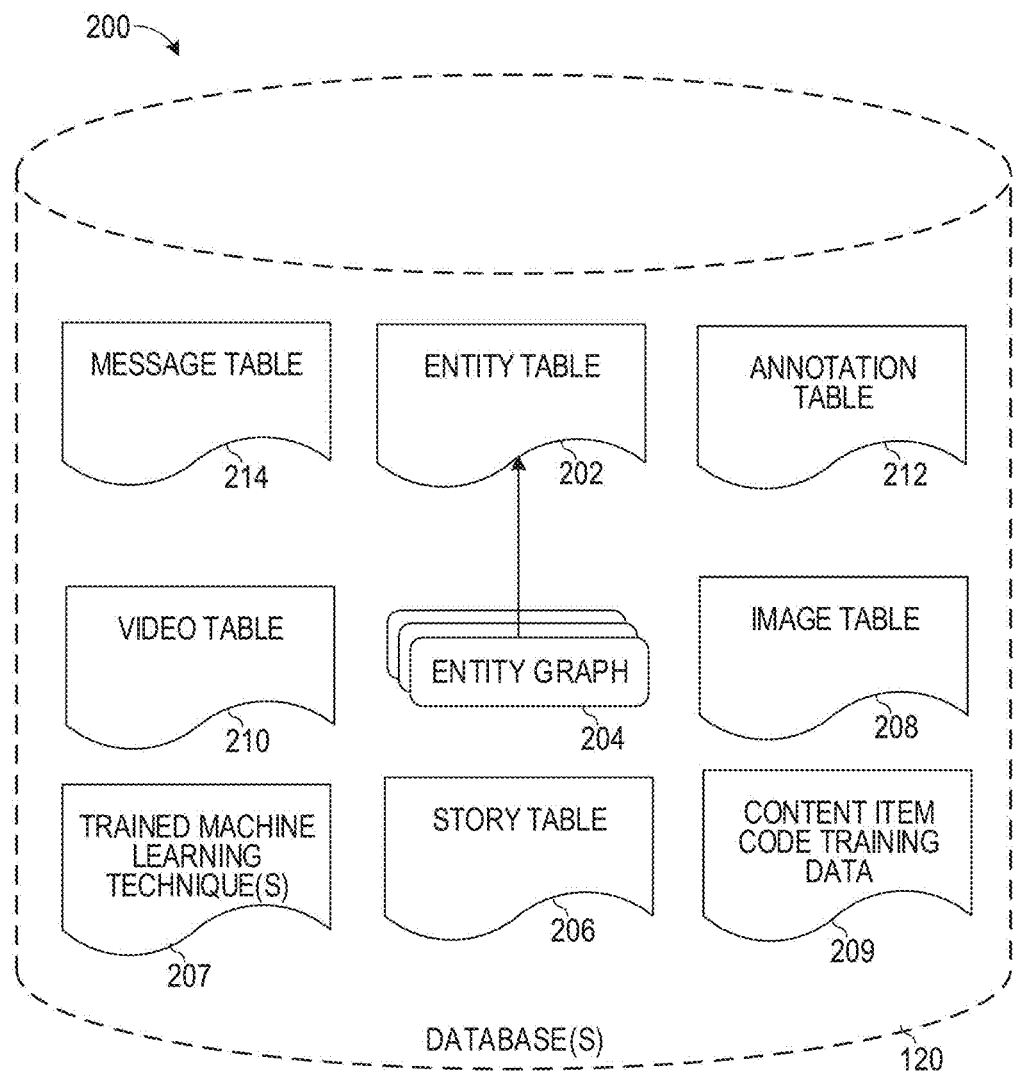
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 furthermore stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s).

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

Trained machine learning technique(s) 207 stores parameters that have been trained during training of the object decoding system 124. For example, trained machine learning techniques 207 stores the trained parameters of a neural network machine learning technique. The trained machine learning technique 207 stores parameters of a first machine learning technique that is trained to classify whether a portion of an image includes a content item code or does not include the content item code. The trained machine learning technique 207 stores parameters of a second machine learning technique that is trained to identify key points of a content item code depicted in an image portion that has one or more visual qualities that fail to satisfy one or more respective thresholds and decode the content item code.

Content item code training data 209 stores a set of training data that includes a plurality of images of one or more training content item codes in which the images have one or more visual qualities that fail to satisfy one or more respective thresholds. The content item code training data 209 include respective ground truth images of the content item codes depicted in the plurality of images. Specifically, the plurality of images may depict one or more content item codes and have visual qualities that fail to satisfy the thresholds while the ground truth images depict the same one or more content item codes and have visual qualities that do not fail to satisfy the thresholds. The training images that depict the content item codes that have the visual qualities that fail to satisfy the thresholds are paired or associated with the corresponding ground truth images. For example, each training image may represent a different distance, different brightness, a different noise level, degree of tilt, and amount of blur of the respective one or more training content item codes. This content item code training data 209 is used by the object decoding system 124 to train the machine learning technique to identify key points of a content item code depicted in an image portion that has one or more visual qualities that fail to satisfy one or more respective thresholds.

In some embodiments, the content item code training data 209 is generated by synthesizing various training content item codes. As an example, the content item codes may be a rectangle or square that includes a central image bounded by a code region between a border of the rectangle or square and a border of the central image (e.g., an avatar or picture of a user). The central image may be generated by selecting a random image from a plurality of images which is then attached on a random background. The central image with the random background is combined with a predetermined code pattern to generate the training content item code. The training content item code size is varied from 50 mm to 200 mm, a capture distance from 0.5 m to 10 m, and a focused depth from 0.5 m to 10 m, respectively. For example, a user can capture first images of the training content item code from different distances between 0.5 m to 10 m to generate a first set of training content item code images in the training data 209. The user can capture second images of the training content item code at different sizes from 50 mm to 200 mm to generate a second set of training content item code images in the training data 209. The user can capture third images of the training content item code at different brightness and/or noise levels to generate a third set of training content item code images in the training data 209. The user can capture second images of the training content item code at different focus depths from 0.5 m to 10 m to generate a fourth set of training content item code images in the training data 209. In some cases, one or more of the first, second, third, and fourth sets of training content item code images may be synthesized from another one of the first, second, third, and fourth sets of training content item code images. In this way, a user need only capture a single image of the content item code and the image is modified to simulate the disruptive pattern and reduce the image quality of the image in different manners to generate the training data 209.

Returning to FIG. 2, a story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
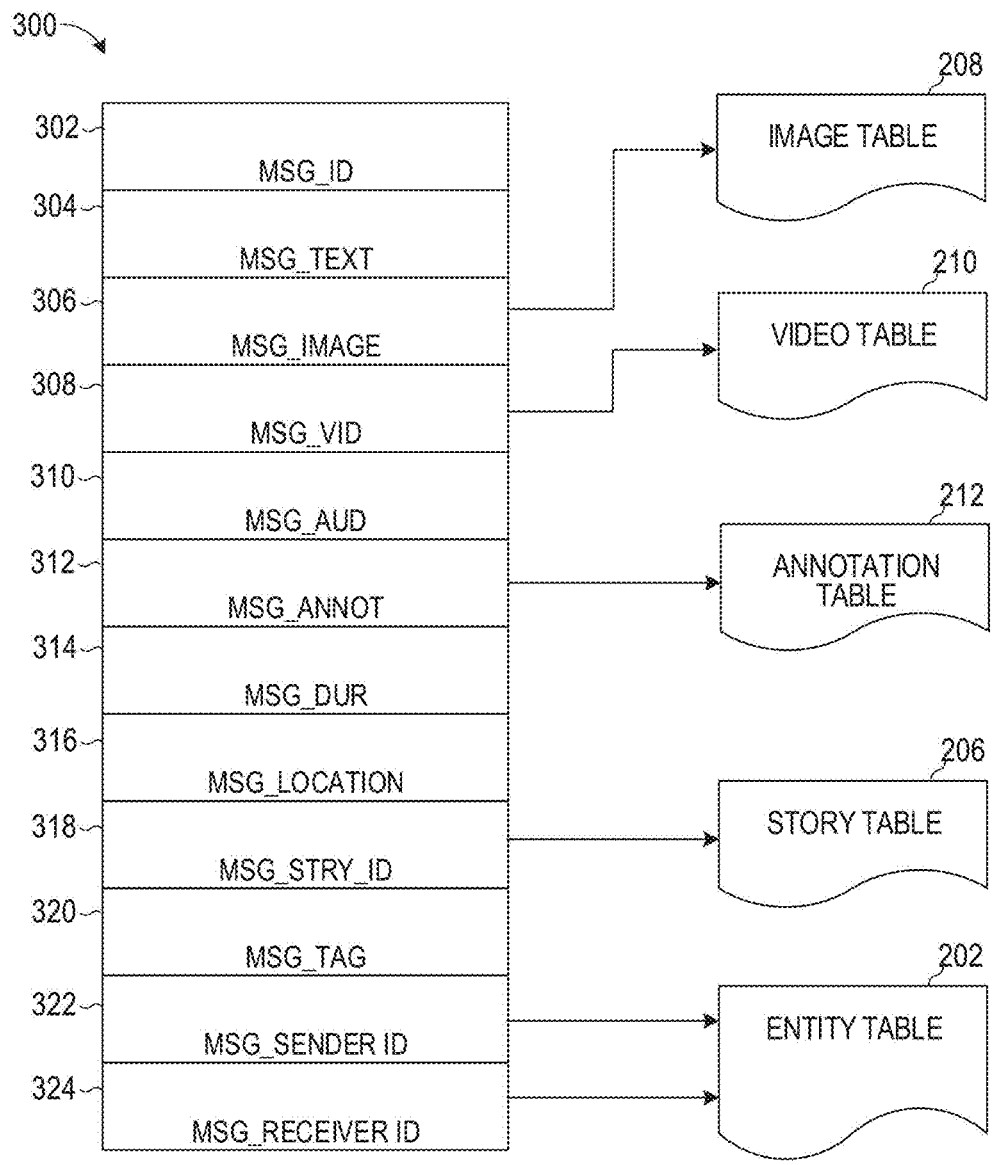
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

A message identifier 302: a unique identifier that identifies the message 300.

A message text payload 304: text, to be generated by a user via a UI of the client device 102 and that is included in the message 300.

A message image payload 306: image data, captured by a camera component of a client device 102 or retrieved from memory of a client device 102, and that is included in the message 300.

A message video payload 308: video data, captured by a camera component or retrieved from a memory component of the client device 102 and that is included in the message 300.

A message audio payload 310: audio data, captured by a microphone or retrieved from the memory component of the client device 102, and that is included in the message 300.

Message annotations 312: annotation data (e.g., filters, stickers, or other enhancements) that represents annotations to be applied to message image payload 306, message video payload 308, or message audio payload 310 of the message 300.

A message duration parameter 314: parameter value indicating, in seconds, the amount of time for which content of the message (e.g., the message image payload 306, message video payload 308, message audio payload 310) is to be presented or made accessible to a user via the messaging client application 104.

A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).

A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.

A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.

A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
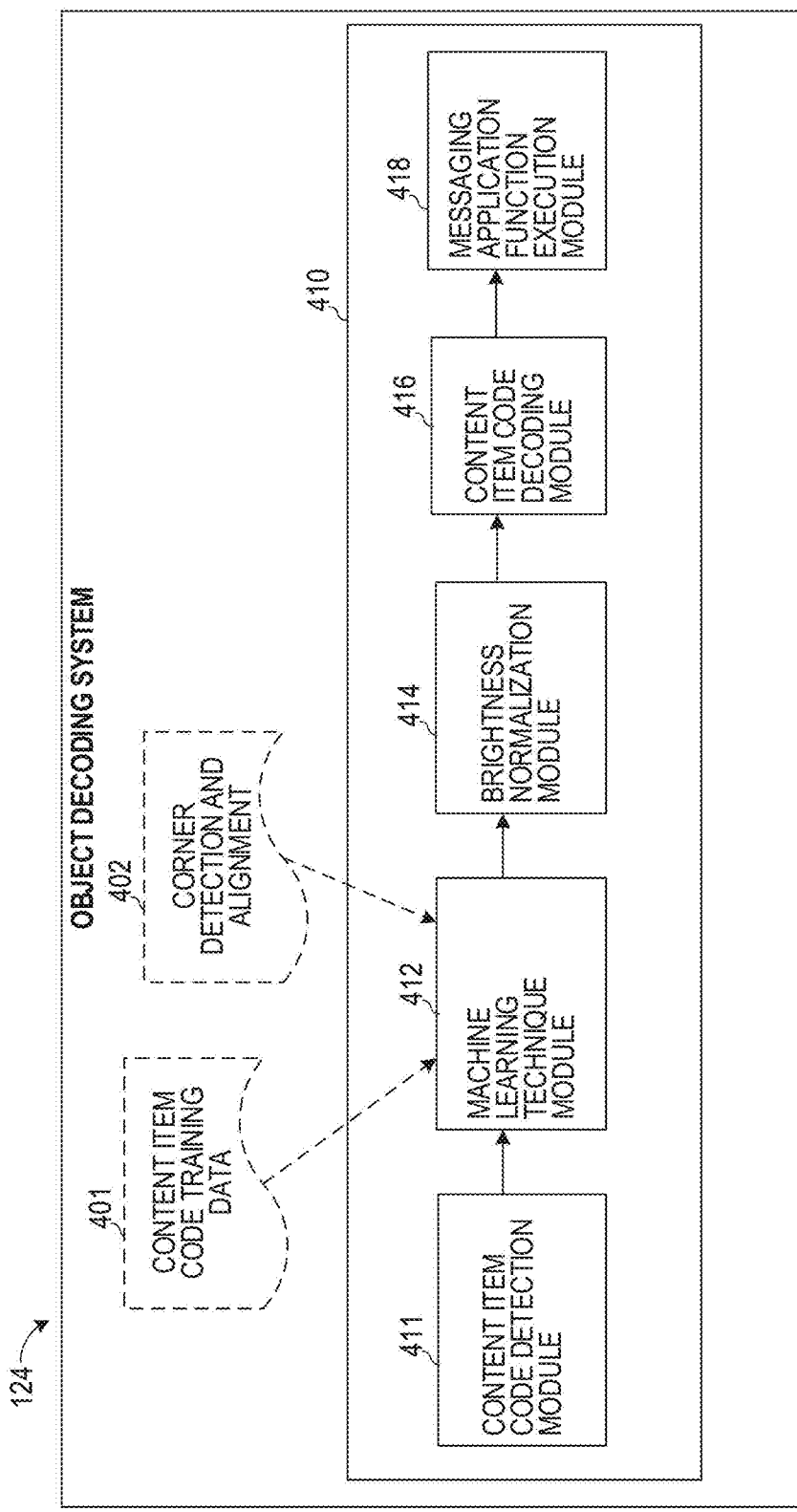
FIG. 4 is a block diagram showing an example object decoding system, according to example embodiments.

FIG. 4 is a block diagram showing an example object decoding system 124, according to example embodiments. Object decoding system 124 includes a set of modules 410 that operate on a set of input data (e.g., content item code training data 401). The set of input data is obtained from content item code training data 209 stored in database(s) 200 during the training phases. After the machine learning technique of object decoding system 124 is trained, the object decoding system 124 operates on an image captured by a messaging client application 104 or other application implemented on client device 102.

Object decoding system 124 includes a content item code detection module 411, a machine learning technique module 412, a brightness normalization module 414, a content item code decoding module 416, and a messaging application function execution module 418. In some cases, the content item code detection module 411 includes a separate machine learning model than machine learning technique module 412. Namely, the machine learning model in content item code detection module 411 is trained to classify whether an image portion includes a content item code or not while the machine learning technique module 412 is trained to estimate points of a content item code depicted in an image that has one or more image qualities that fail to satisfy a respective threshold.

The machine learning techniques implemented by the content item code detection module 411 and/or by machine learning technique module 412 include respective machine learning (ML) algorithms or models. ML algorithms or ML models or techniques can be summarized as function approximation. Training data consisting of input-output pairs of some type (e.g., an image portion that depicts a content item code and that has one or more image qualities that fail to satisfy a respective threshold paired with the ground truth content item code and/or the key points of the ground truth content item code) are acquired and a function is "trained" to approximate this mapping (e.g., from the image portion that depicts a content item code and that has one or more image qualities that fail to satisfy a respective threshold to the key points (or key point heatmap) of the content item code). Some methods involve NNs. In these, a set of parametrized functions $A_\theta$ are selected, where $\theta$ is a set of parameters (e.g., convolution kernels and biases) that are selected by minimizing the average error over the training data. If the input-output pairs are denoted by ($x_m$, $y_m$), the function can be formalized by solving a minimization problem such as:

$$\min_\theta \sum_{m=1}^{M} \|A_\theta(x_m) - y_m\|^2$$

Once the network has been trained (e.g., $\theta$ has been selected), the function Ae can be applied to any new input. For example, a never-before-seen image portion that depicts a content item code and that has one or more image qualities that fail to satisfy a respective threshold can be fed into $A_\theta$, and the key points (or key point heatmap) of the depicted content item code are estimated or predicted. As another example, a never-before-seen image that includes various portions some of which depict a content item code can be fed into Ae, and the portions are classified as whether the respective portions include or do not include a content item code.

Simple NNs consist of an input layer, a middle or hidden layer, and an output layer, each containing computational units or nodes. The hidden layer(s) nodes have input from all the input layer nodes and are connected to all nodes in the output layer. Such a network is termed "fully connected." Each node communicates a signal to the output node depending on a nonlinear function of the sum of its inputs. For a classifier, the number of input layer nodes typically equals the number of features for each of a set of objects being sorted into classes, and the number of output layer nodes is equal to the number of classes. A network is trained by presenting it with the features of objects of known classes and adjusting the node weights to reduce the training error by an algorithm called backpropagation. Thus, the trained network can classify novel objects whose class is unknown.

Neural networks have the capacity to discover relationships between the data and classes or regression values, and under certain conditions, can emulate any function y=ƒ(x) including non-linear functions. In ML, an assumption is that the training and test data are both generated by the same data-generating process, $p_{data}$, in which each {$x_i$, $y_i$} sample is identically and independently distributed (i.i.d.). In ML, the goals are to minimize the training error and to make the difference between the training and test errors as small as possible. Underfitting occurs if the training error is too large; overfitting occurs when the train-test error gap is too large. Both types of performance deficiency are related to model capacity: large capacity may fit the training data very well but lead to overfitting, while small capacity may lead to underfitting.

Figure 6A:
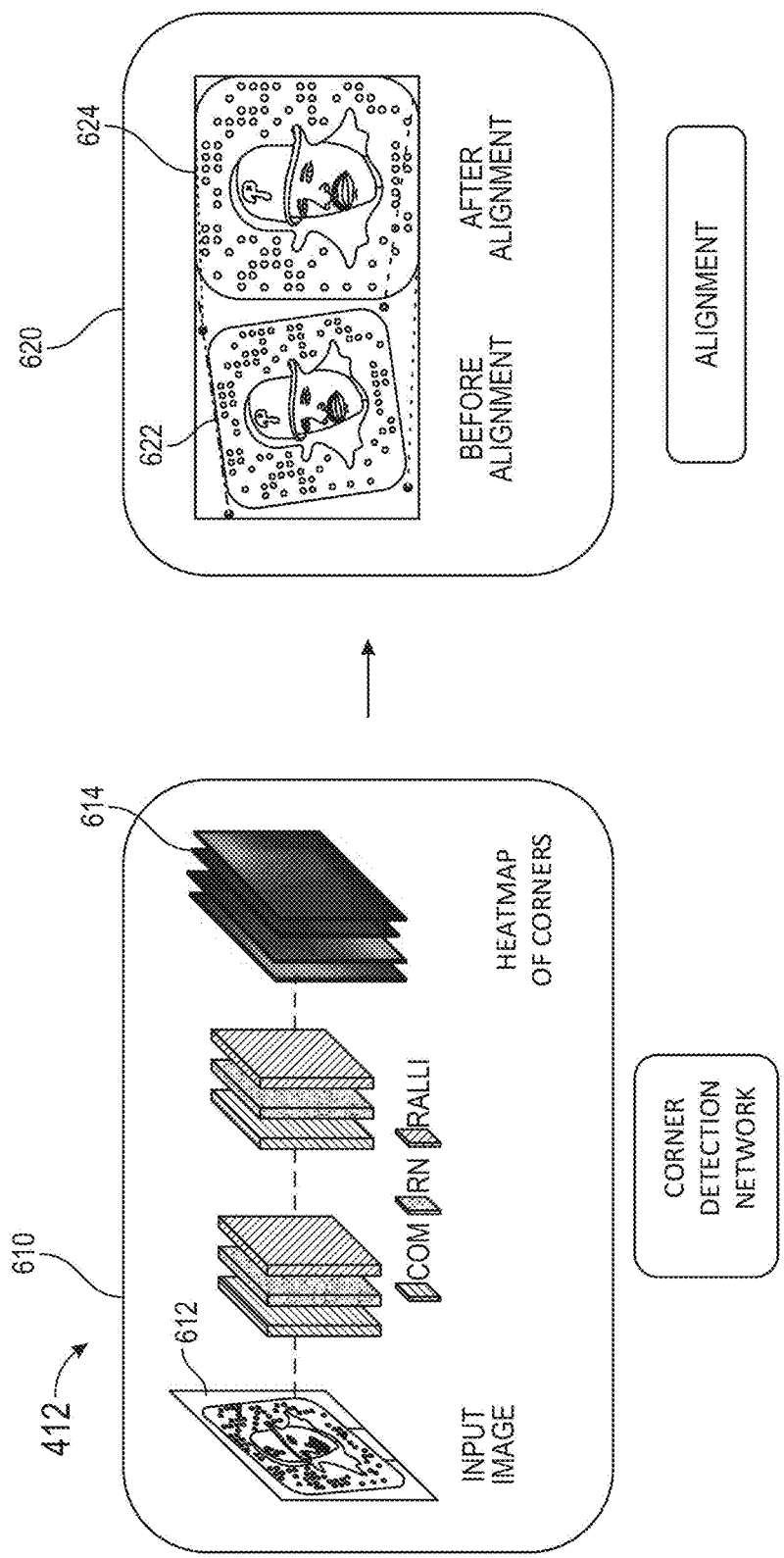
FIG. 6A is a block diagram showing a machine learning technique module, according to example embodiments.
Figure 6B:
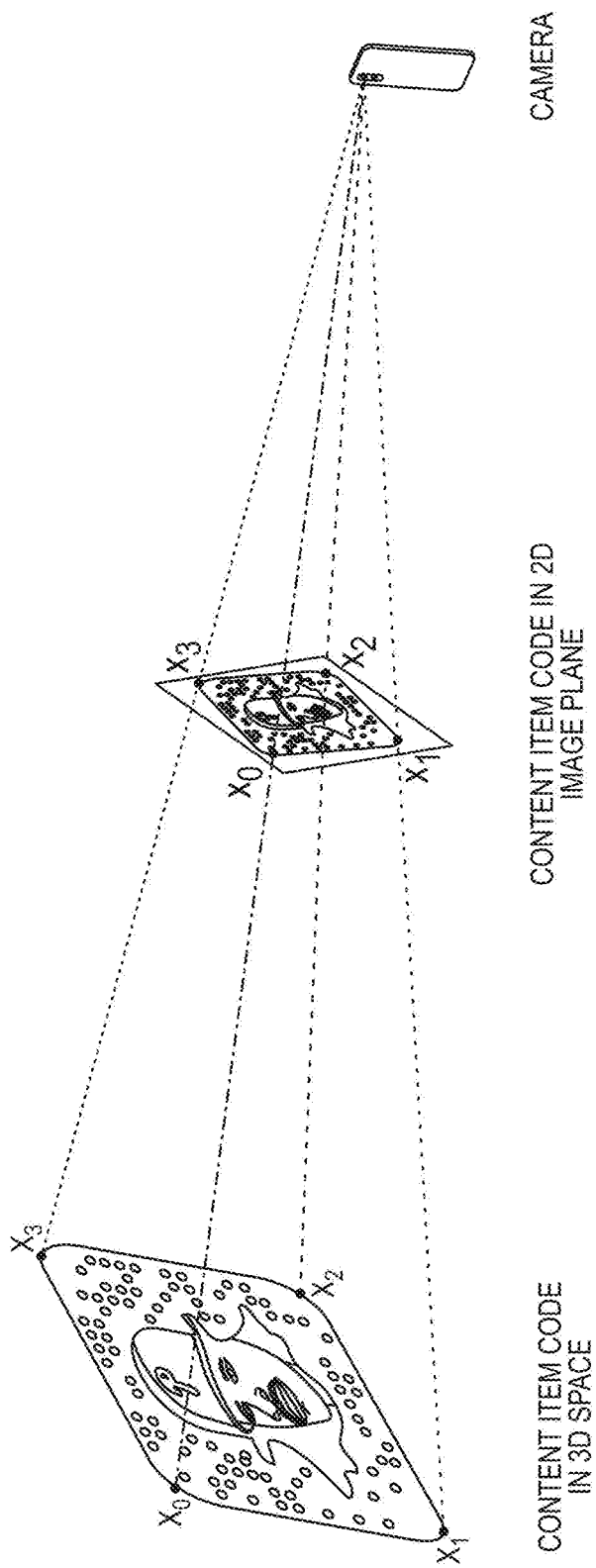
FIG. 6B shows a geometric constraint of the machine learning technique module, according to example embodiments.
Figure 6C:
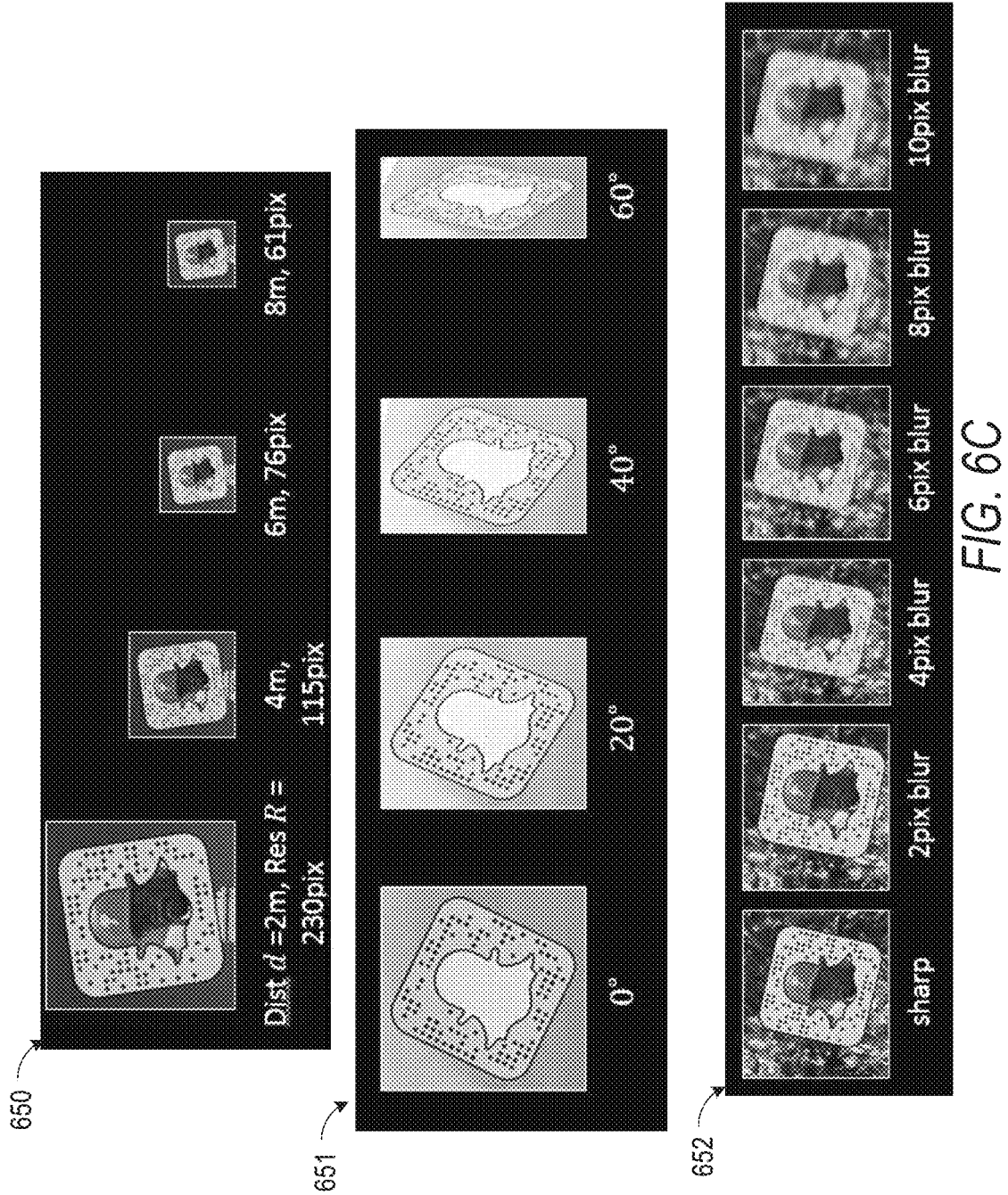
FIG. 6C shows illustrative training data of the machine learning technique module, according to example embodiments.

During training, according to the disclosed embodiments, machine learning technique module 412 obtains a first training data pair that includes a training image portion that depicts a training content item code with the one or more visual qualities that fail to satisfy the one or more respective thresholds and a training ground truth content item code. FIG. 6C shows illustrative training content item code images (or testing data that includes content item code images) having one or more visual qualities that fail to satisfy the one or more respective thresholds. The side length of content item codes depicted in FIG. 6C is 150 mm. As an example, a first set of training content item codes 650 includes various images that depict a content item code captured at different distances and/or image resolutions including an image captured from a 2 meter distance and a 230 pixel resolution, an image captured from a 4 meter distance and a 115 pixel resolution, image captured from a 6 meter distance and a 76 pixel resolution, and an image captured from a 8 meter distance and a 61 pixel resolution. As another example, a second set of training content item codes 651 includes various images that depict a content item code captured at different tilts including an image captured with a 0 degree tilt, an image captured with a 20 degree tilt, image captured with a 40 degree tilt, and an image captured with a 60 degree tilt. As another example, a third set of training content item codes 652 includes various images that depict a content item code captured at different blur amounts including an image captured with a sharp quality and no blur amount, an image captured with a 2 pixel blur amount, image captured with a 4 pixel blur amount, an image captured with a 6 pixel blur amount, an image captured with a 8 pixel blur amount, and an image captured with a 10 pixel blur amount. In some implementations, the training content item codes depicted in FIG. 6C are synthesized from an RGB image of a content item code and have random size, random distance, random tilt, random blur, random brightness, and random noise as one or more visual qualities that fail to satisfy the one or more respective thresholds.

Referring back to FIG. 4, the machine learning technique module 412 processes the training image portion with the machine learning model to estimate key point locations (and/or a key point heatmap), such as the four corners, of the training content item code depicted in the training image portion and computes a deviation between the estimated key point locations and key point locations of the training ground truth content item code. The machine learning technique module 412 updates parameters of the machine learning technique module 412 based on the computed deviation. In some embodiments, the machine learning technique module 412 includes a neural network and the machine learning technique module 412 applies a loss function to the machine learning technique module 412 that includes a geometric constraint in which the four detected corners must be perspective projection of a square in 3D space.

For example, based on a difference threshold of the comparison or deviation between the estimated key point locations and key point locations of the training ground truth content item code, the machine learning technique module 412 updates one or more coefficients and obtains one or more additional training content item code images. After a specified number of epochs or training content item code images have been processed and/or when the difference threshold reaches a specified value, the machine learning technique module 412 completes training and the parameters and coefficients of the machine learning technique module 412 are stored in trained machine learning technique(s) 207.

A geometry constraint $L_g$ in a total loss function (described below) may be determined based on a relationship between a square in 3D space and its projection of corners in the image plane. Specifically, as shown in FIG. 6B, the 4 corners in the 3D space in the camera's coordinate system are denoted as $X_0$, $X_1$, $X_2$, and $X_3$ and their projections are denoted as $x_0$, $x_1$, $x_2$, and $x_3$ in the image plane, respectively. The third dimension of $x_i$ may also be f since it is projected on z=f plane where f is the focal length of the camera. In such scenarios, the constraints may be defined as follows:

$$X_i = k_i x_i$$

$$X_0 - X_1 \perp X_2 - X_1$$

$$\|X_0 - X_1\|_2 = \|X_2 - X_1\|_2$$

$$X_3 = X_0 + X_2 - X_1$$

In this way, the relation of the projected point $x_1$ on the image plane and the 3D space point $X_i$ is linear multiplication; the two connected edges are perpendicular to each other and of equal length; and the $4^{th}$ square point can be decided by the first 3 points.

Even though the value of $k_i$ is unknown and is different for different projections, the content item code may be scaled in 3D space without changing its projection. Without loss of generality, $k_0$ may be assumed as 1 and $k_1$ and $k_2$ may be solved according to Equation 2:

$$\begin{cases} x_0 - k_1 x_1 \perp k_2 x_2 - k_1 x_1 \\ \|x_0 - k_1\|_2 = \|k_2 x_2 - k_1 x_1\|_2 \end{cases} \quad (2)$$

Such a system of equations has 2 unknowns and 2 constraints. It is also non-linear and has at most 4 solutions which is corresponded to at most 4 geometry arrangements. It may be beneficial to constrain the $4^{th}$ point in the detection. In this way, the $4^{th}$ point detection is written as a loss function (geometry constraint $L_g$) in the estimated homography that is used to train the machine learning technique module 412 to estimate key points of a content item code.

In some embodiments, the content item code may be of any size but can be assumed to be of length d on one of its sides. The content item code may be square in which case the length d is equal on all four sides. In such cases, the world coordinate system may be constructed such that the 4 corners are defined as Equation 3:

$$[X'_0 \ X'_1 \ X'_2 \ X'_3] = \begin{bmatrix} d & 0 & 0 & d \\ 0 & 0 & d & d \\ 0 & 0 & 0 & 0 \end{bmatrix} \text{ and} \quad (3)$$

(3) and $$[k_0 x_0 \ k_1 x_1 \ k_2 x_2 \ k_3 x_3] = [R \ T] \begin{bmatrix} X'_0 & X'_1 & X'_2 & X'_3 \\ 1 & 1 & 1 & 1 \end{bmatrix}$$

To distinguish, $X'_0$, $X'_1$, $X'_2$, and $X'_3$ are used to denote the square in the world coordinates. This square can be rotated and translated from world coordinate into camera coordinates by rotation matrix R and translation vector T. The third row in Equation 3 is totally 0 allowing simplification. Namely, assuming $[R\ T]=[r_0\ r_1\ r_2\ r_3]$, then the following Equation 4 can be determined:

$$[k_0 x_0 \ k_1 x_1 \ k_2 x_2 \ k_3 x_3] = [r_0 \ r_1 \ t] \begin{bmatrix} d & 0 & 0 & d \\ 0 & 0 & d & d \\ 1 & 1 & 1 & 1 \end{bmatrix}. \quad (4)$$

According to Equation 4, if the detected points are mapped to 4 corners of a square via a homography, the first two columns in the estimated homography matrix are two columns of a rotation matrix. This leads to a homography constraint in which for a computed homography matrix that maps 4 detected corners to 4 corners of a square, the first column and the second column are perpendicular and have the same length. This relationship is used to create the $L_g$ loss in the training of the machine learning technique module 412. The parameters of the $L_g$ loss may be provided as part of the corner detection and alignment 402.

In some cases, the key point heatmap or key point estimation process is supervised by an L2 loss of the prediction to the ground truth. Namely, the coefficients and parameters of the machine learning technique module 412 are updated based on a total loss L that is made up of a key point detection loss $L_k$, a geometry constraint $L_g$, and a bit recognition loss $L_b$. The total loss L may be written as follows:

$$L = w_k L_k + w_g L_g + L_b$$

where $$L_k = \sum_{i=1}^{4} \|C^i - C_0^i\|^2,$$

$$L_g = h_0^T h_1 + \|h_0 - h_1\|^2,$$

$$L_b = -\frac{1}{N} \sum B_i^{gt} \log B_i^{pre} + (1 - B_i^{gt}) \log(1 - B_i^{pre})$$

$C^i_0$ are ground truth of the corners, $h_0$ and $h_1$ are first two columns of the computed homograph matrix, and $w_k$ and $w_g$ are set as 10 and 3, respectively. $B^{gt}_i$ and $B^{pre}_i$ are the GT bit value and predicted bit value for the ith pixel. N is 324 when the code size is 18×18. In some cases, training is performed according to the PyTorch framework.

After training, according to the disclosed embodiments, machine learning technique module 412 receives a portion of an image that depicts a content item code captured by given user from a client device 102. In some cases, this image may include one or more image qualities that fail to satisfy a respective image quality threshold, parameter or metric. The object decoding system 124 applies the trained machine learning technique module 412 to the received portion of the image to predict or estimate key points of the content item code depicted in the image.

In some embodiments, machine learning technique module 412 receives the portion of the image that depicts the content item code from the content item code detection module 411. For example, a user may capture an image of an entire billboard in a real-world environment in which the billboard depicts a content item code in the bottom right corner. The content item code detection module 411 processes the image of the entire billboard to classify which portion(s) of the image include a content item code or not. The portions determined by the content item code detection module 411 as including the content item code are cropped from the image of the entire billboard, such as by drawing a rectangular, circular, or square box around that portion (bounding that portion) of the image and extracting that portion of the image. This cropped portion of the image is provided to the machine learning technique module 412 for identifying more specifically the key points or corners of the content item code depicted in the cropped portion of the image.

Figure 5:
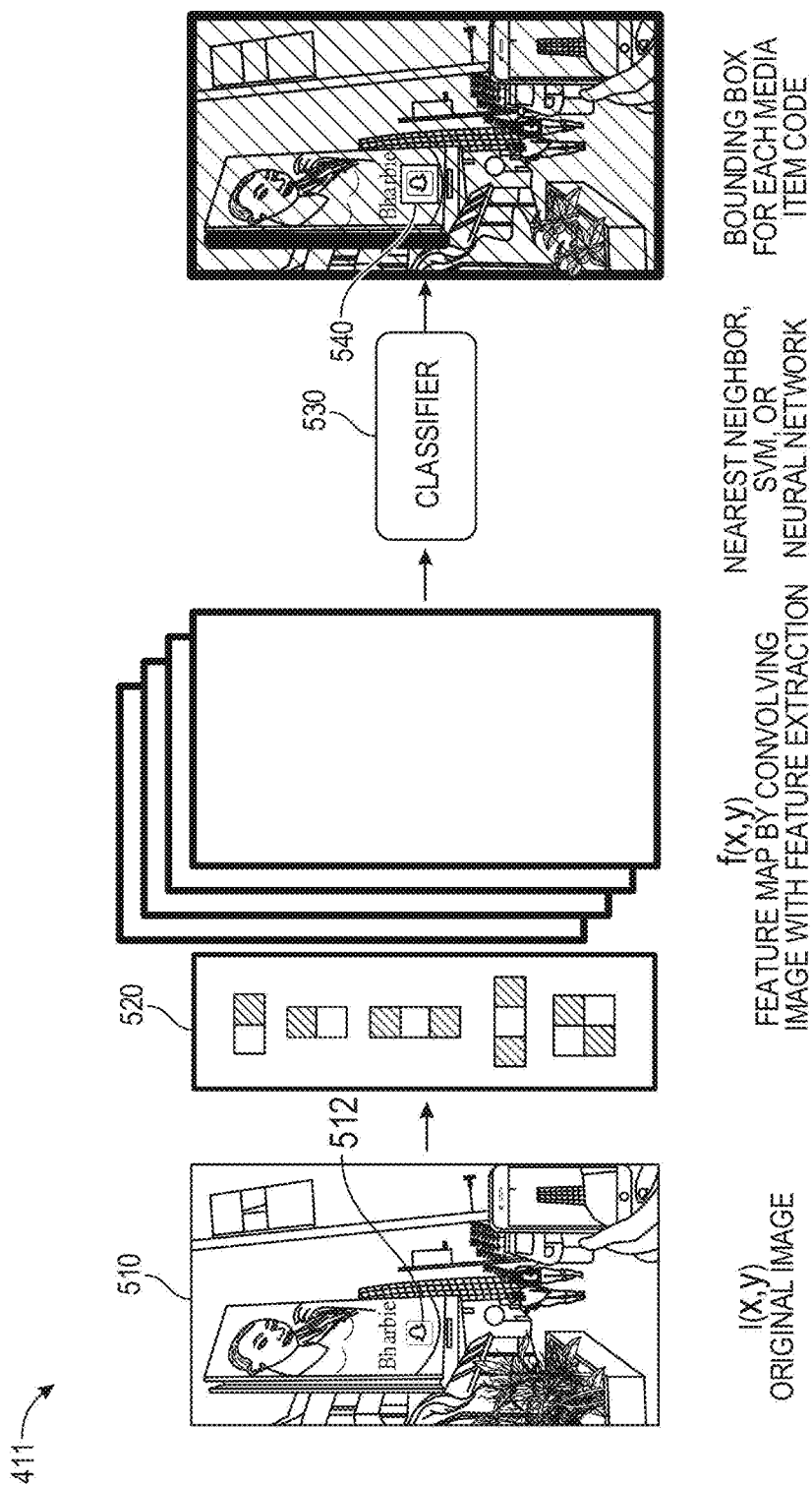
FIG. 5 is a block diagram showing a content item code detection module, according to example embodiments.

FIG. 5 is a block diagram showing the content item code detection module 411, according to example embodiments. Specifically, as shown in FIG. 5, an image 510 of an entire billboard depicted in a real-world environment is received from the client device 102. The billboard includes a content item code 512. Because the image of the billboard is captured from very far away, such as more than 40 meters, the image of the billboard that depicts the content item code 512 includes an image quality that fails to satisfy an image resolution threshold. The content item code detection module 411 applies a function 520 to the received image that convolves the image with one or more feature extraction filters, such as Haar filters. This convolved image is provided to a trained classifier 530 to indicate which image portions include a content item code and which image portions do not include a content item code.

As an example, the classifier 530 may be implemented using a nearest neighbor technique, a support vector machine learning technique, or a neural network. The content item code detection module 411 generates a bounding box 540 around the portion of the image that has been classified as including the content item code. The content item code detection module 411 then crops or extracts that portion of the image and provides that portion of the image to the machine learning technique module 412.

FIG. 6 is a block diagram showing the machine learning technique module 412, according to example embodiments. As shown, the machine learning technique module 412 includes a ML model 610 that receives the cropped image 612 that depicts the content item code from the content item code detection module 411. The ML model 610 processes the cropped image 612 to generate and estimate a key point heatmap 614 that identifies or estimates key points of the content item code depicted in the cropped image 612. In some implementations, the cropped image 612 may be a red, green, and blue (RGB) image and is changed to a gray scale image by the ML model 610 to reduce the influence of multiple background colors prior to estimating the key points. In some cases, the grey scale image is further resized into 128×128 resolution prior to estimating the key points.

In some embodiments, the key point heat map 614 estimated by the ML model 610 is converted to corner positions in accordance with Equation 1:

$$C^i = \sum_{j=1,\ldots,4096} H^i_j P_{ji} \text{ where} \qquad (1)$$

$$\sum_{j=1,\ldots,4096} H^i_j = 1,$$

$C^i$ and $H^i$ are the ith corner position and heat map, respectively. The position of the $C^i$ is calculated by the sum over the position of each pixel $P_j$ multiplied by its corresponding probability $H^i_j$. H may be normalized by a SoftMax layer such that the sum of the all probability is equal to 1.

In an embodiment, the ML model 610 (the key point detection network) is made up of 7 convolution layers. Each of the convolution layers adopts 7×7 kernel size and is followed by a batch normalization and ReLU layer. The first convolution layer sets the stride as 2 to resize the input image from 128×128 to 64×64 in order to reduce computation cost. The following convolution layers set stride as 1 and use padding to keep the image size fixed to avoid losing details. The output of layers 1 and 3 and layers 4 and 6 are linked to form a ResNet structure to broaden the gradients back propagation paths. The total kernel number is set as 32 in the layers 1, 2, and 3 and 64 in layers 4, 5, and 6. In layer 7, the image is reduced into 4 since each content item code has 4 corners. To further enlarge the receptive field, the dilation is set to 2 in layers 4, 5, 6 and 7.

The ML model 610 outputs a content item code 622 that is misaligned. The ML model 610 identifies key points (e.g., the four corners) of the content item code 622. Using the key points, an alignment module 620 aligns the content item code to generate an aligned content item code 624. The alignment module 620 provides the aligned content item code 624 to brightness normalization module 414 for further processing prior to decoding the content item code.

Figure 6D:
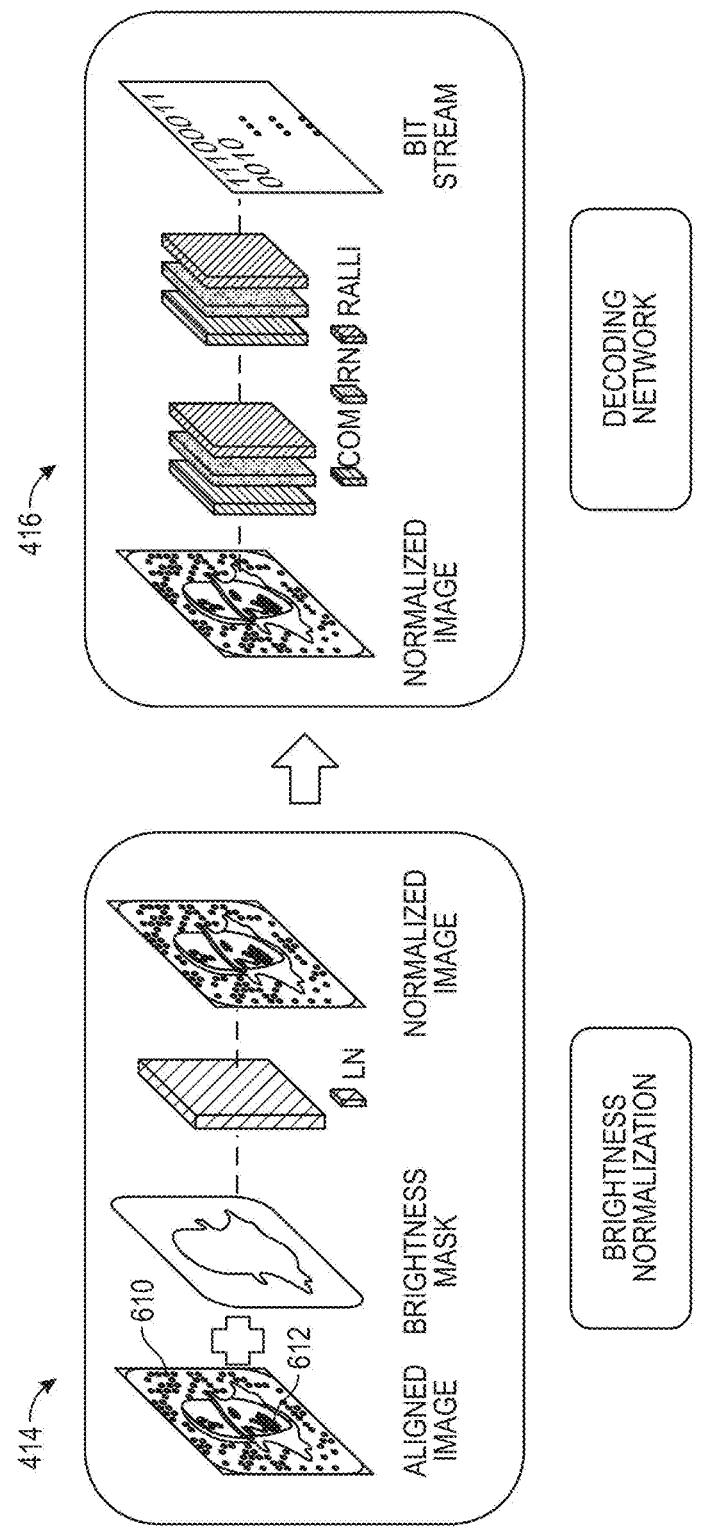
FIG. 6D is a block diagram showing a brightness normalization and content item decoding modules, according to example embodiments.

Referring back to FIG. 5, the brightness normalization module 414 further processes the aligned content item code 624 provided by the machine learning technique module 412. Namely, in some cases, brightness of the content item code varies due to different printing materials, lighting conditions and camera settings. As such, the aligned content item code 624 is first normalized to remove brightness variation and then to detect its bit stream. For example, as shown in FIG. 6D, the aligned content item code 624 is passed through a brightness normalization process 414 to apply a brightness mask to generate a normalized image prior to being decoded.

For a general object, due to arbitrary shape and reflectance which depends on both illumination angle and viewing angle, the brightness of each image pixel is complicated. In some cases, brightness of the content item code is simplified because the content item code may be composed of two reflectances, mostly yellow and black colors. Since the content item code is a plane, its normal remains the same everywhere and it can be assumed that light is parallel in the infinity and the camera is far away from the code. In such cases, the brightness of the entire content item code image can be described as a linear transform, a scale and an offset of the original content item code regardless of how complicated the reflectance of the printing material is. Such variation can be removed by a zero-mean, one-std normalization. In some implementations, the content item code image is normalized based only on the code region 610 and disregarding any user supplied image portion or user selected graphic portion 612 of the content item code. The normalized image is then passed through a decoding network 416 to retrieve the instructions or code represented by the content item code.

Decoding network 416 recognizes bits from the aligned, normalized image and decodes the bits into the corresponding information (e.g., instructions for the messaging client application 104). In an embodiment, the decoding network 416 decodes the encoded information from the content item code. It has Reed-solomon error-correction mechanisms which make the system more robust. Decoding the bits into information may be performed using a neural network that is composed of 4 convolution layers each layer using a 5×5 kernel size.

The decoded bits of information are provided to the messaging application function execution module 418. The messaging application function execution module 418 decodes the bits of information into instructions to cause the messaging client application 104 to perform one or more functions. For example, the decoded bits of information may cause messaging application function execution module 418 to instruct the messaging client application 104 to add one or more new friends to an account of a user with the messaging client application 104, activate one or more image modification functions of the messaging client application 104 (e.g., filters, graphical elements, text, universal resource locators, and so forth), or retrieve one or more content items stored at a remote location referenced by the decoded instructions.

Figure 7:
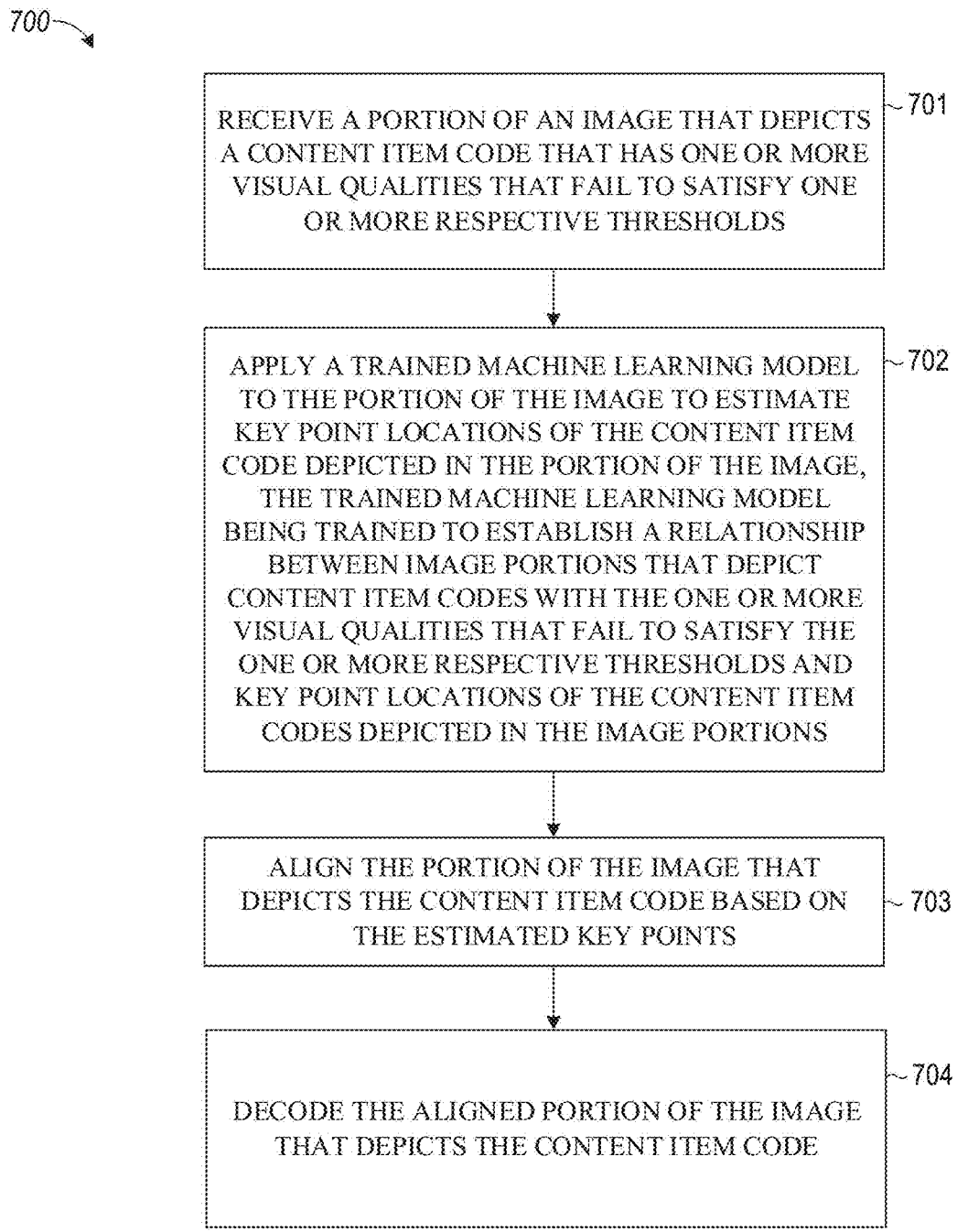
FIG. 7 is a flowchart illustrating example operations of the object decoding system, according to example embodiments.

FIG. 7 is a flowchart illustrating example operations of the object decoding system 124 in performing process 700, according to example embodiments. The process 700 may be embodied in computer-readable instructions for execution by one or more processors such that the operations of the process 700 may be performed in part or in whole by the functional components of the messaging server system 108; accordingly, the process 700 is described below by way of example with reference thereto. However, in other embodiments, at least some of the operations of the process 700 may be deployed on various other hardware configurations. The process 700 is therefore not intended to be limited to the messaging server system 108 and can be implemented in whole, or in part, by any other component. Some or all of the operations of process 700 can be in parallel, out of order, or entirely omitted.

At operation 701, the object decoding system 124 receives a portion of an image that depicts a content item code that has one or more visual qualities that fail to satisfy one or more respective thresholds.

At operation 702, the object decoding system 124 applies a trained machine learning model to the portion of the image to estimate key point locations of the content item code depicted in the portion of the image, the trained machine learning model being trained to establish a relationship between image portions that depict content item codes with the one or more visual qualities that fail to satisfy the one or more respective thresholds and key point locations of the content item codes depicted in the image portions.

At operation 703, the object decoding system 124 aligns the portion of the image that depicts the content item code based on the estimated key point locations.

At operation 704, the object decoding system 124 decodes the aligned portion of the image that depicts the content item code.

Figure 8A:
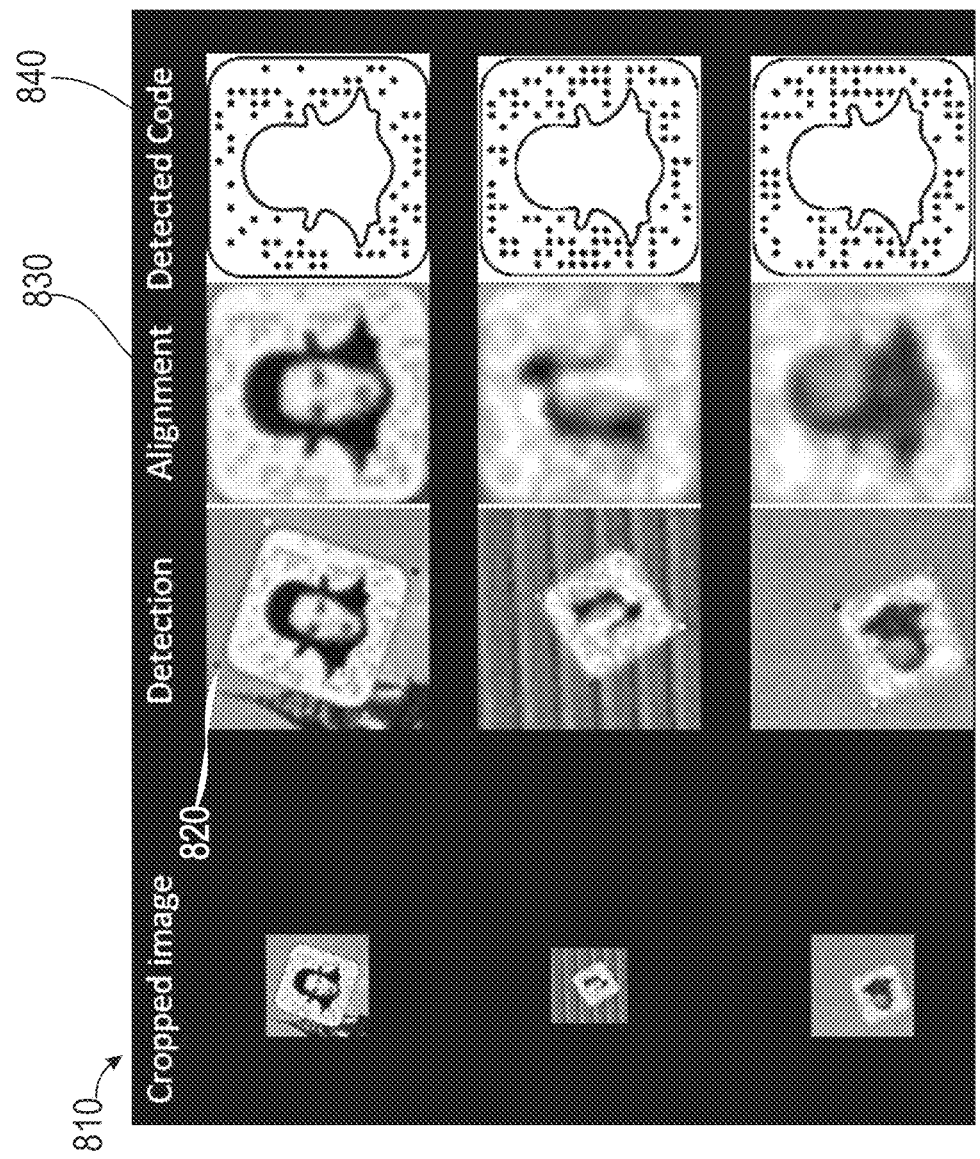
FIGS. 8A-F are illustrative inputs and outputs of the object decoding system, according to example embodiments.
Figure 8B:
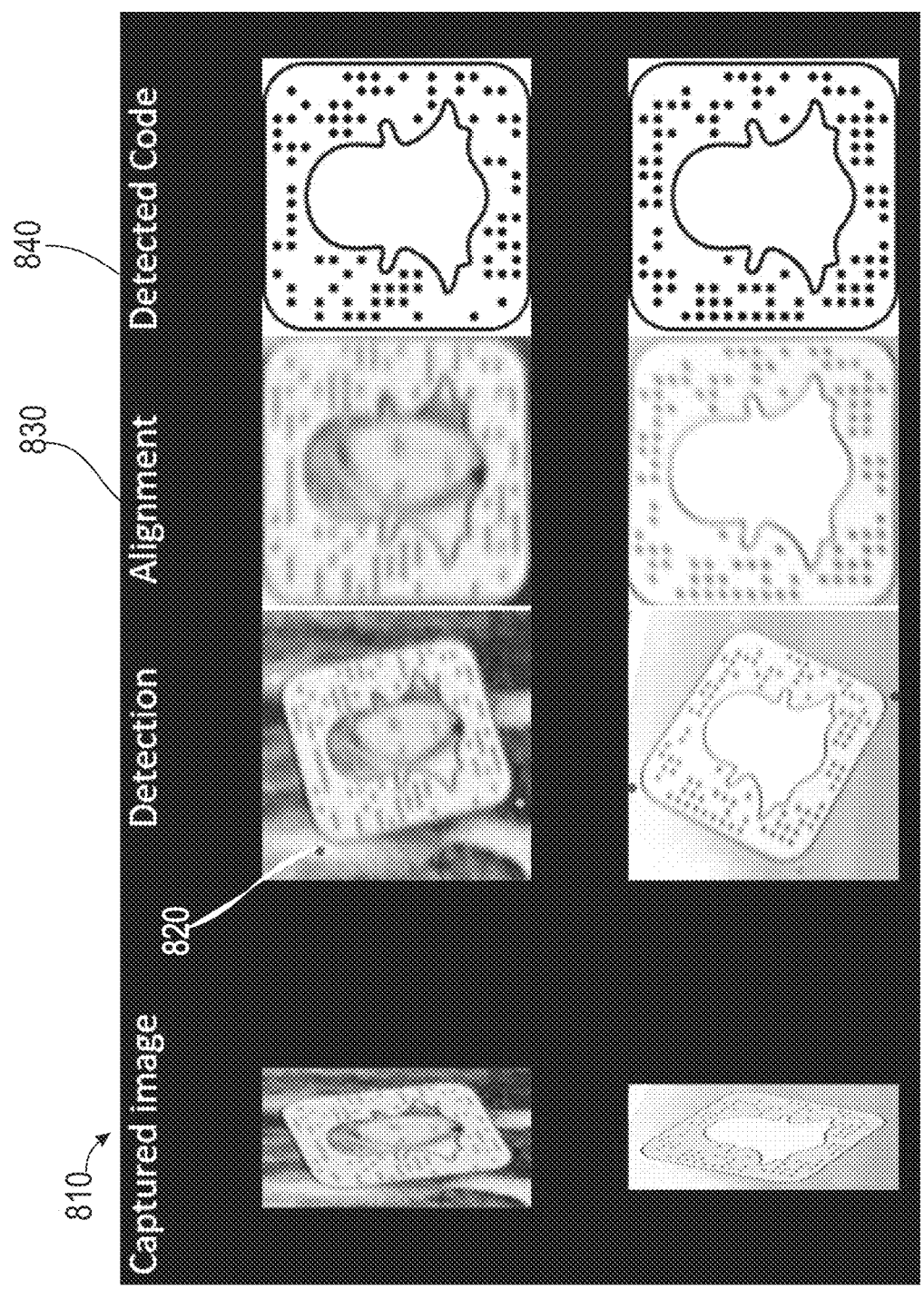
Figure 8C:
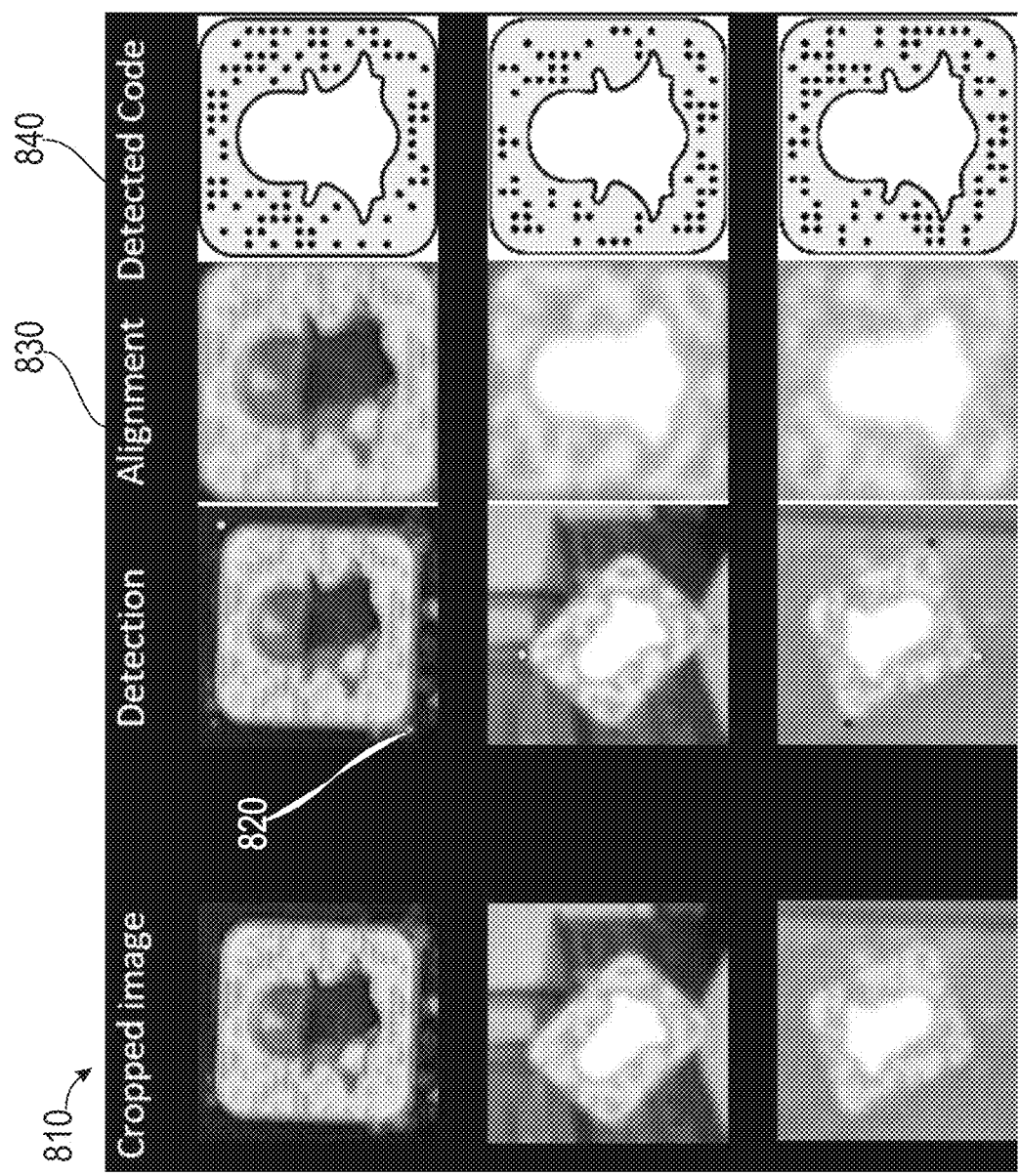
Figure 8D:
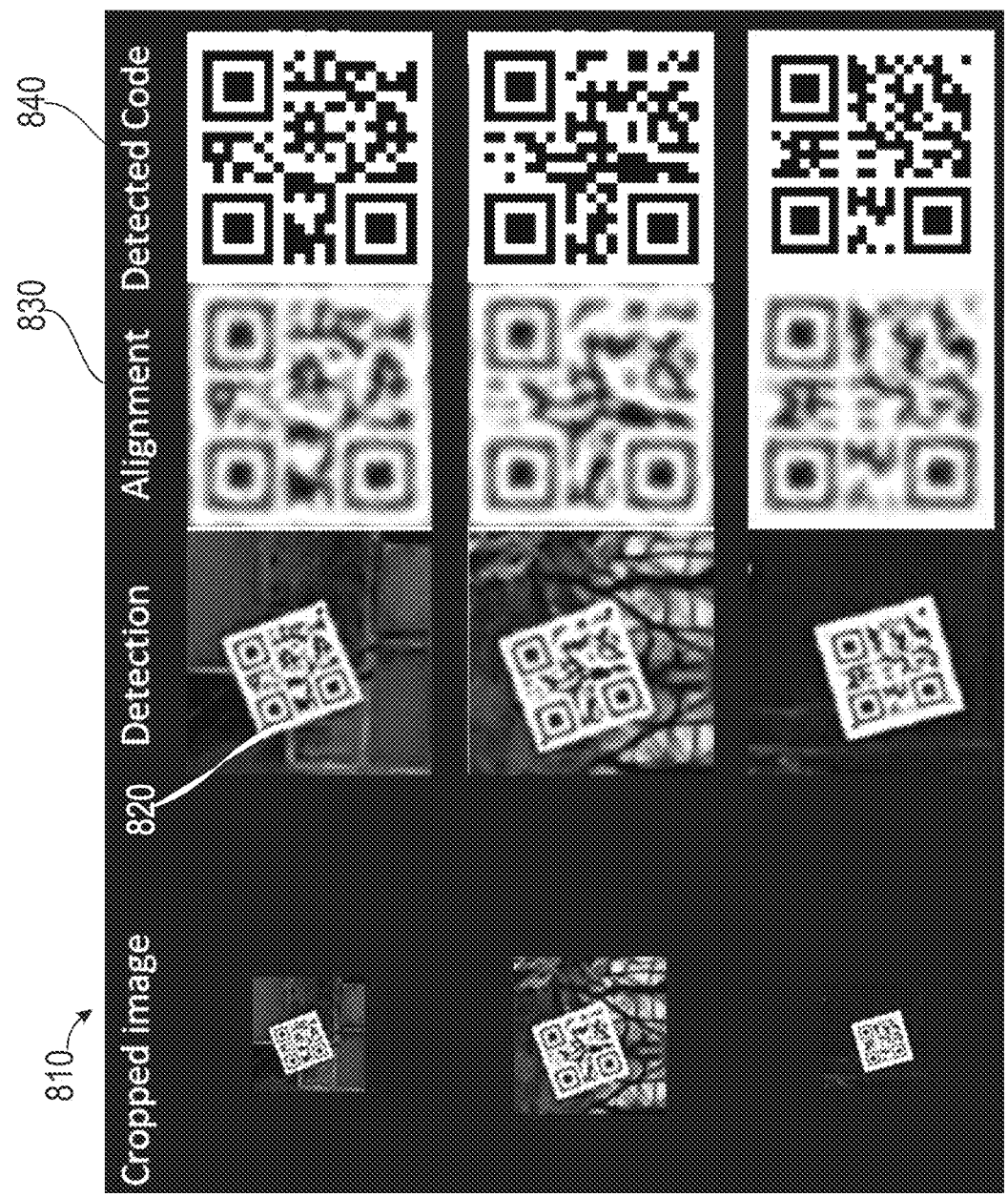

FIGS. 8A-F are illustrative inputs and outputs of the object decoding system, according to example embodiments. Specifically, FIGS. 8A and 8D shows an example in which the captured image portion 810 that depicts a content item code is received. The captured image portions 810 that are shown in FIGS. 8A and 8D may have varying degrees of resolution. The object decoding system 124 processes the captured image portions 810 to estimate the key point locations 820 of the content item codes depicted in the captured images using the trained ML model. The object decoding system 124 aligns the content item codes 830 that are depicted based on the estimated key point locations 820 and then applies a brightness and normalization filter to generate the detected code 840.

Figure 8E:
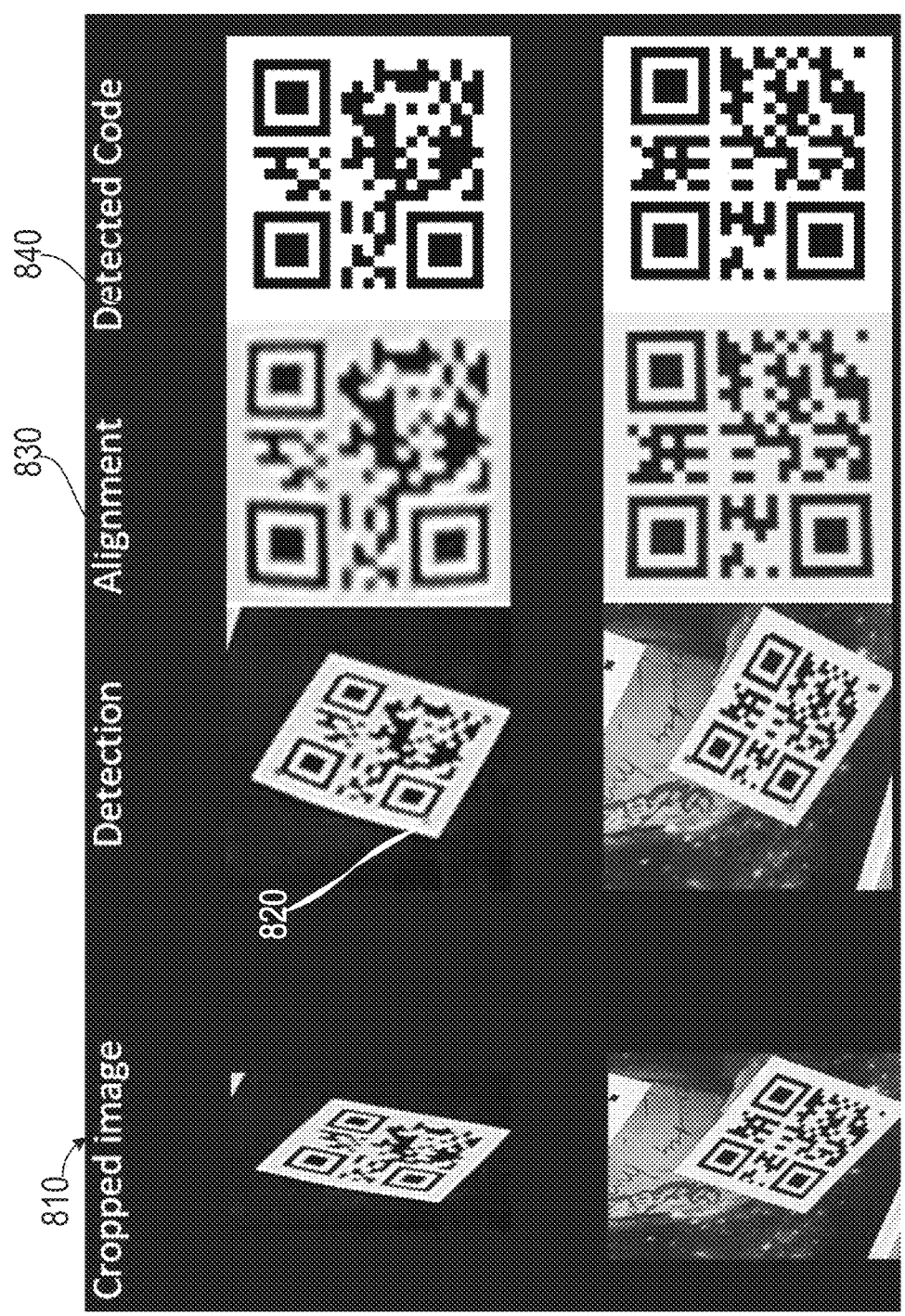

FIGS. 8B and 8E shows an example in which the captured image portion 810 that depicts a content item code is received. The captured image portions 810 that are shown in FIGS. 8B and 8E may have varying degrees of tilt. The object decoding system 124 processes the captured image portions 810 to estimate the key point locations 820 of the content item codes depicted in the captured images using the trained ML model. The object decoding system 124 aligns the content item codes 830 that are depicted based on the estimated key point locations 820 and then applies a brightness and normalization filter to generate the detected code 840.

Figure 8F:
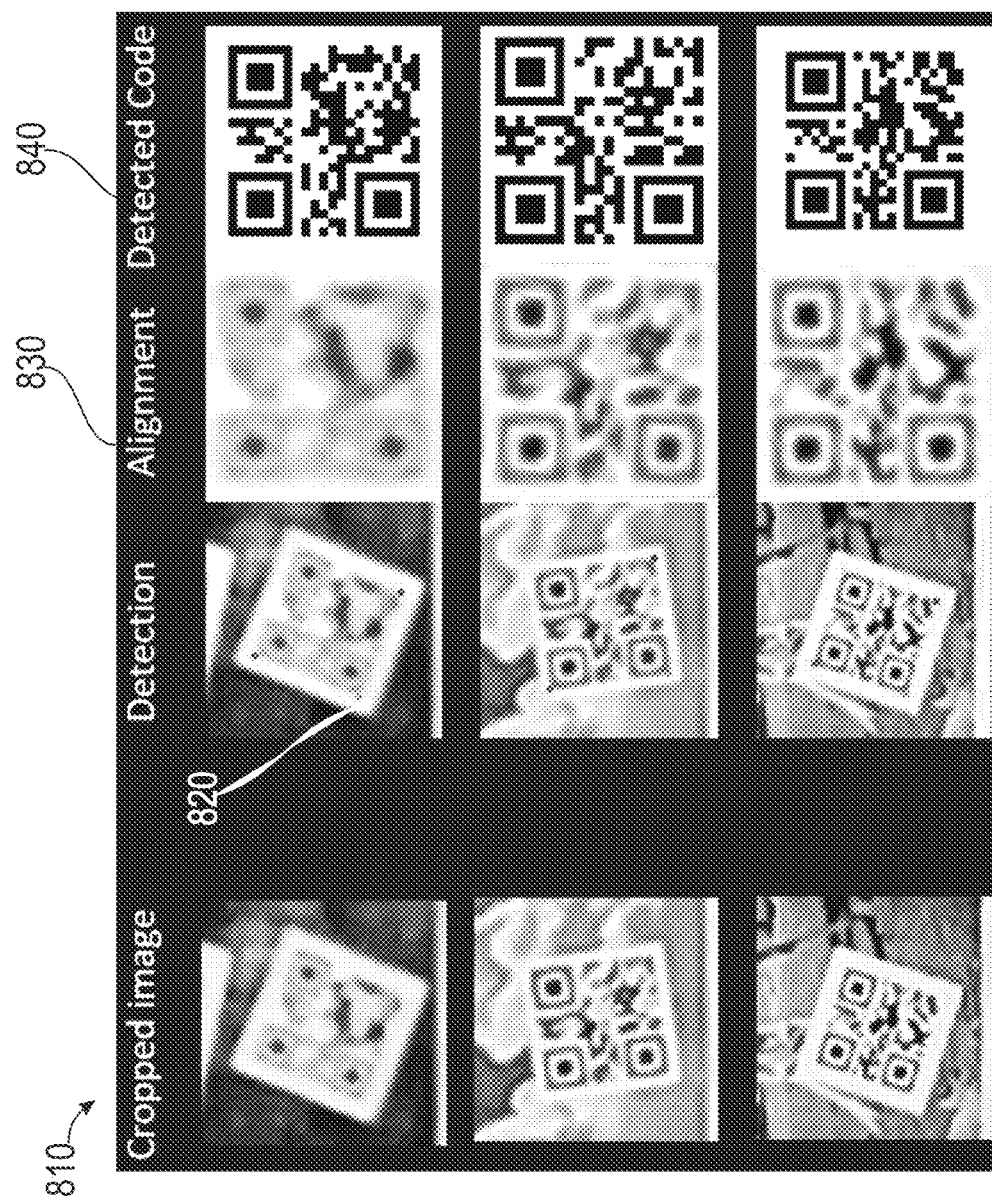

FIGS. 8C and 8F shows an example in which the captured image portion that depicts a content item code is received. The captured image portions 810 that are shown in FIGS. 8C and 8F may have varying degrees of blur. The object decoding system 124 processes the captured image portions 810 to estimate the key point locations 820 of the content item codes depicted in the captured images using the trained ML model. The object decoding system 124 aligns the content item codes 830 that are depicted based on the estimated key point locations 820 and then applies a brightness and normalization filter to generate the detected code 840.

Figure 9:
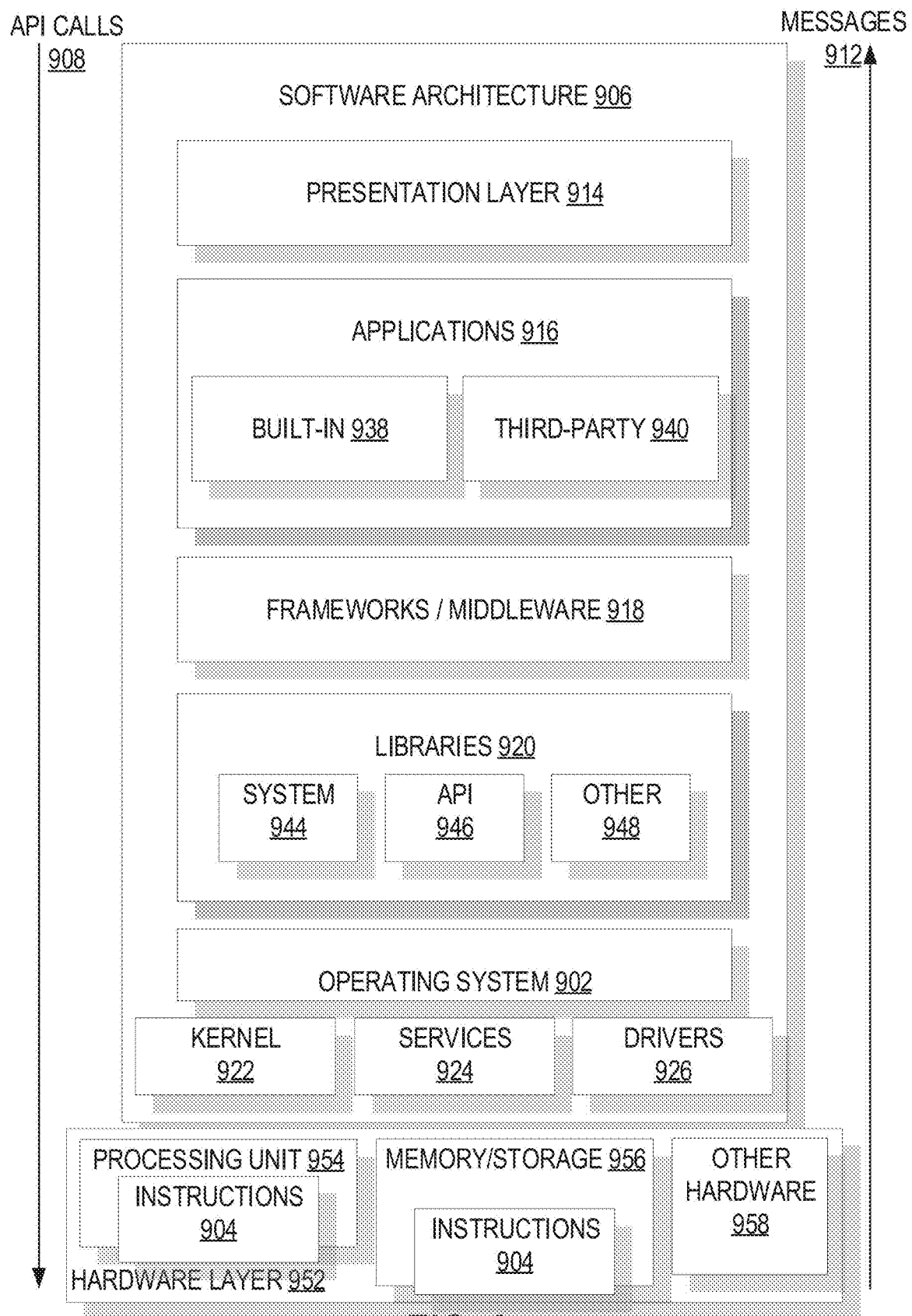
FIG. 9 is a block diagram illustrating a representative software architecture, which may be used in conjunction with various hardware architectures herein described, according to example embodiments.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as machine 1000 of FIG. 10 that includes, among other things, processors 1004, memory 1014, and input/output (I/O) components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules memory/storage 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke API calls 908 through the software stack and receive messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphic UI (GUI) functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built-in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 10:
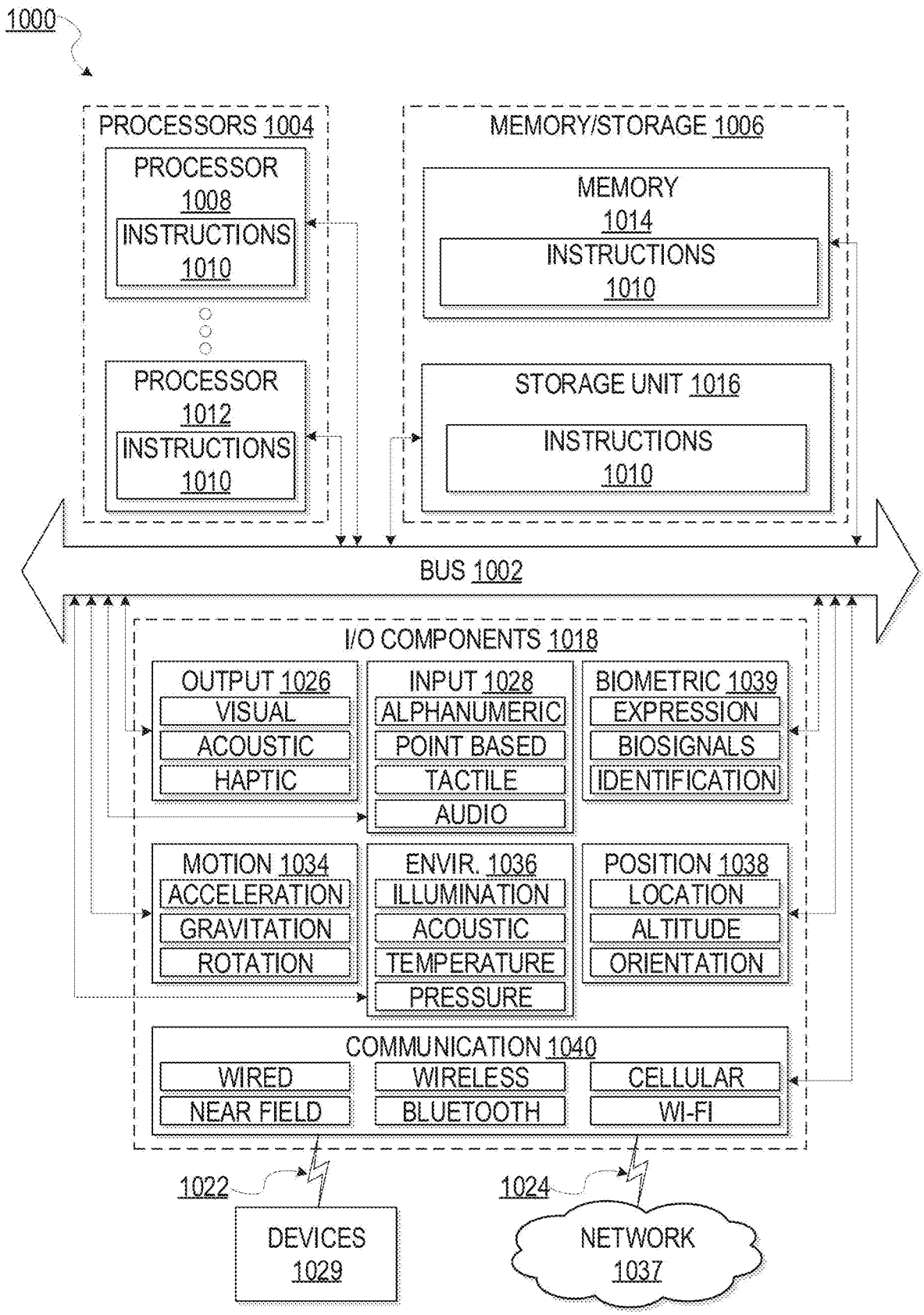
FIG. 10 is a block diagram illustrating components of a machine able to read instructions from a machine-readable medium (e.g., a machine-readable storage medium) and perform any one or more of the methodologies discussed herein, according to example embodiments.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. In an example embodiment, the processors 1004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1008 and a processor 1012 that may execute the instructions 1010. The term "processor" is intended to include multi-core processors 1004 that may comprise two or more independent processors (sometimes referred to as "cores") that may execute instructions contemporaneously. Although FIG. 10 shows multiple processors 1004, the machine 1000 may include a single processor with a single core, a single processor with multiple cores (e.g., a multi-core processor), multiple processors with a single core, multiple processors with multiple cores, or any combination thereof.

The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1039, motion components 1034, environmental components 1036, or position components 1038 among a wide array of other components. For example, the biometric components 1039 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1037 or devices 1029 via coupling 1024 and coupling 1022, respectively. For example, the communication components 1040 may include a network interface component or other suitable device to interface with the network 1037. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1029 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code,", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising: receiving, by one or more processors, a portion of an image that depicts a content item code that has one or more visual qualities that fail to satisfy one or more respective thresholds; applying a trained machine learning model to the portion of the image to estimate a key point heatmap representing key point locations of the content item code depicted in the portion of the image, the trained machine learning model being trained to establish a relationship between image portions that depict content item codes with the one or more visual qualities that fail to satisfy the one or more respective thresholds and key point locations of the content item codes depicted in the image portions wherein the trained machine learning model is trained based on a loss function comprising a key point detection loss, a geometry constraint and a bit recognition loss;
   aligning the portion of the image that depicts the content item code based on the estimated key point locations; and decoding the aligned portion of the image that depicts the content item code.

2. The method of claim 1, wherein decoding the aligned portion of the image that depicts the content item code comprises:
   decoding instructions for a messaging client application that are encoded in the content item code; and
   performing a function with the messaging application based on the decoded instructions.

3. The method of claim 2, wherein the function comprises at least one of adding one or more new friends to an account of a user with the messaging client application, activating one or more image modification functions of the messaging client application, or retrieving one or more content items stored at a remote location referenced by the decoded instructions.

4. The method of claim 1, further comprising:
   detecting the content item code within the image; and
   cropping the portion of the image that includes the detected content item code.

5. The method of claim 4, wherein the detecting comprises:
    processing a plurality of portions of the image using another trained machine learning model to associate each of the plurality of portions with a classification that indicates whether a given one of the plurality of portions includes the content item code; and
    generating a bounding box around the portion of the plurality of portions of the image that is associated with the classification that indicates that the portion includes the content item code, the generating of the bounding box comprising applying non-maximum suppression to the portion that is associated with the classification that indicates the portion includes the content item code.

6. The method of claim 1, wherein the content item code comprises a geometric shape that includes an avatar bounded by a code region between a border of the avatar and a border of the geometric shape.

7. The method of claim 1, wherein the machine learning model is trained based on training data comprising a plurality of training images of one or more training content item codes, each training image representing a different distance, different brightness, a different noise level, degree of tilt, and amount of blur of the one or more training content item codes, the plurality of training images being paired with a training ground truth content item code.

8. The method of claim 1, wherein the content item code is represented in the portion of the image as a rectangular or square graphic that includes a central image and a code region between a border of the central image and a border of the rectangular or square graphic.

9. The method of claim 1, further comprising generating a plurality of training images for training the machine learning model by:
    randomly selecting a given image from a plurality of images;
    attaching a random background to the randomly selected given image to generate a central image; and
    combining the central image with a predetermined code pattern to generate a given one of the plurality of training images.

10. The method of claim 1, further comprising:
    applying a brightness mask to the aligned portion of the image that depicts the content item code;
    normalizing the aligned portion of the image that depicts the content item code to which the brightness mask was applied to output a normalized image; and
    applying a decoding process to normalized image generate a bitstream comprising instructions for a messaging client application.

11. The method of claim 1, wherein the one or more visual qualities comprises at least one of an image resolution that is outside an image resolution threshold range, a tilt that is greater than a number of degrees threshold, a brightness that is outside a brightness threshold range, noise that exceeds a noise threshold, or an amount of image blur that is greater than a blur threshold range.

12. The method of claim 11, wherein the image resolution threshold range is between 1.5N×1.5N and above pixels for a given content item code that comprises N×N bits.

13. The method of claim 11, wherein the number of degrees threshold is greater than or equal to 45 degrees.

14. The method of claim 11, wherein the blur kernel size threshold range is between 0.2 and 2 of bit size 1 and 10 pixels for a given image that is 128×128 in which a given content item code that comprises 18×18 bits occupies at least 70% of an area.

15. The method of claim 1, wherein the machine learning model is trained in a supervised approach by:
    obtaining a first training data pair comprising a training image portion that depicts a training content item code with the one or more visual qualities that fail to satisfy the one or more respective thresholds and a training ground truth content item code;
    processing the training image portion with the machine learning model to estimate key point locations of the training content item code depicted in the training image portion;
    computing a deviation between the estimated key point locations and key point locations of the training ground truth content item code; and
    updating parameters of the machine learning model based on the computed deviation.

16. The method of claim 15, further comprising generating a plurality of training data comprising the first training data pair by generating a plurality of images of one or more training content item codes, each image representing a different distance, different brightness, a different noise level, degree of tilt, and amount of blur of the one or more training content item codes.

17. The method of claim 15, wherein the machine learning model comprises a neural network, further comprising applying a loss function to the machine learning model comprising a geometric constraint in which four detected corner points must be perspective projections of a real square in 3D space based on given three known corners of projection of a square, a fourth corner is constrained to lie in four possible locations.

18. A system comprising: a processor coupled to a memory that stores instructions that, when executed by the processor, cause the processor to perform operations comprising: receiving a portion of an image that depicts a content item code that has one or more visual qualities that fail to satisfy one or more respective thresholds; applying a trained machine learning model to the portion of the image to estimate a key point heatmap representing key point locations of the content item code depicted in the portion of the image, the trained machine learning model being trained to establish a relationship between image portions that depict content item codes with the one or more visual qualities that fail to satisfy the one or more respective thresholds and key point locations of the content item codes depicted in the image portions wherein the trained machine learning model is trained based on a loss function comprising a key point detection loss, a geometry constraint and a bit recognition loss; aligning the portion of the image that depicts the content item code based on the estimated key point locations; and decoding the aligned portion of the image that depicts the content item code.

19. A non-transitory machine-readable storage medium that includes instructions that, when executed by one or more processors of a machine, cause the machine to perform operations comprising: receiving a portion of an image that depicts a content item code that has one or more visual qualities that fail to satisfy one or more respective thresholds; applying a trained machine learning model to the portion of the image to estimate a key point heatmap representing key point locations of the content item code depicted in the portion of the image, the trained machine learning model being trained to establish a relationship between image portions that depict content item codes with the one or more visual qualities that fail to satisfy the one or more respective thresholds and key point locations of the content item codes depicted in the image portions wherein the trained machine learning model is trained based on a loss function comprising a key point detection loss, a geometry constraint and a bit recognition loss; aligning the portion of the image that depicts the content item code based on the estimated key point locations; and decoding the aligned portion of the image that depicts the content item code.

* * * * *